US007197224B2

(12) United States Patent
Rolston et al.

(10) Patent No.: US 7,197,224 B2
(45) Date of Patent: Mar. 27, 2007

(54) OPTICAL FERRULE

(75) Inventors: David Robert Cameron Rolston, Beaconsfield (CA); Tomasz Maj, Montreal (CA)

(73) Assignee: Reflex Photonics Inc., Montreal (CA)

( * ) Notice: Subject to any disclaimer, the term of this patent is extended or adjusted under 35 U.S.C. 154(b) by 56 days.

(21) Appl. No.: 10/625,901

(22) Filed: Jul. 24, 2003

(65) Prior Publication Data

US 2005/0018993 A1 Jan. 27, 2005

(51) Int. Cl.
*G02B 6/00* (2006.01)
(52) U.S. Cl. ...................................... 385/137
(58) Field of Classification Search ................ 385/137, 385/49, 65, 4, 31, 88–94
See application file for complete search history.

(56) References Cited

U.S. PATENT DOCUMENTS

| | | | | |
|---|---|---|---|---|
| 4,130,343 | A * | 12/1978 | Miller et al. ................... | 385/49 |
| 4,766,705 | A | 8/1988 | Dholakia | |
| 5,119,448 | A * | 6/1992 | Schaefer et al. ............... | 385/4 |
| 5,466,558 | A * | 11/1995 | Sasaki ......................... | 438/65 |
| 5,644,667 | A * | 7/1997 | Tabuchi ........................ | 385/49 |
| 6,173,098 | B1 | 1/2001 | Steijer et al. | |
| 6,757,471 | B2 * | 6/2004 | Jeong et al. ................. | 385/137 |

2003/0068137 A1 4/2003 Rolston et al.

FOREIGN PATENT DOCUMENTS

EP 1335221 8/2003

OTHER PUBLICATIONS

Connector Cover for Bevelled Surfaces for Visual Alignment, vol. 39, No. 03, Mar. 1996 XP 000581692 p. 279.

* cited by examiner

*Primary Examiner*—J. F. Duverne
(74) *Attorney, Agent, or Firm*—Ogilvy Renault, LLP

(57) ABSTRACT

An optical connector and a manufacturing method are disclosed. The method for manufacturing an optical connector achieving a mechanical coupling comprises embedding a length of at least one optical fiber in a body to form an assembly. It also comprises to remove, at a first end of the assembly, a portion to provide a beveled surface on a corresponding first end of the optical fiber at which light is reflected for a side coupling. Also, at a portion of a side of the assembly near the first end, the method comprises creating an optical surface to provide a flat coupling surface for said side coupling. The method also comprises removing, at a second end of the assembly, a portion to provide a flat abutment surface including a corresponding second end of the at least one optical fiber. The method also comprises providing at the second end of the assembly a mating structure for precision connecting with a complementary connector in which an optical waveguide is end-coupled with at least one of the optical fiber.

25 Claims, 25 Drawing Sheets

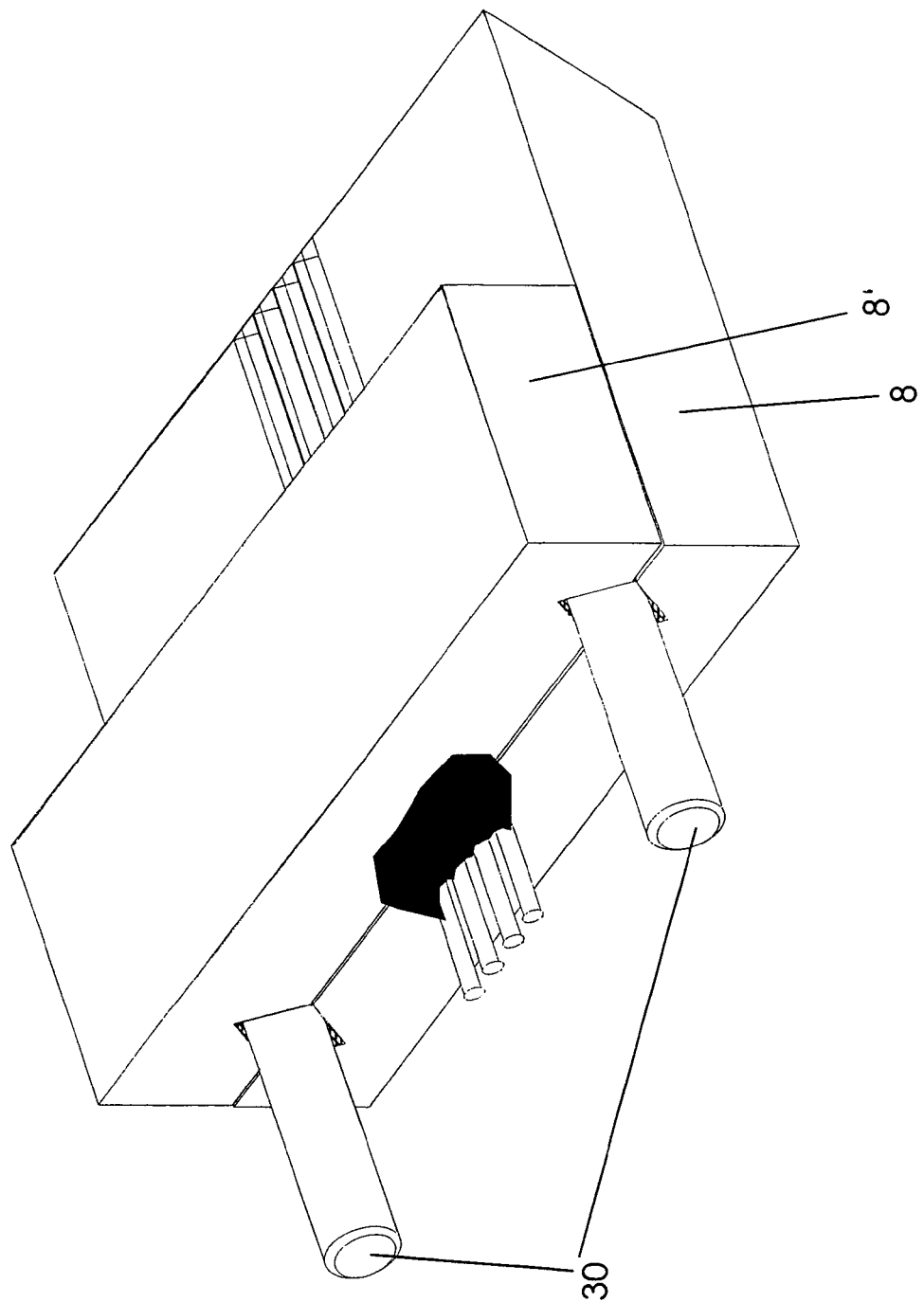

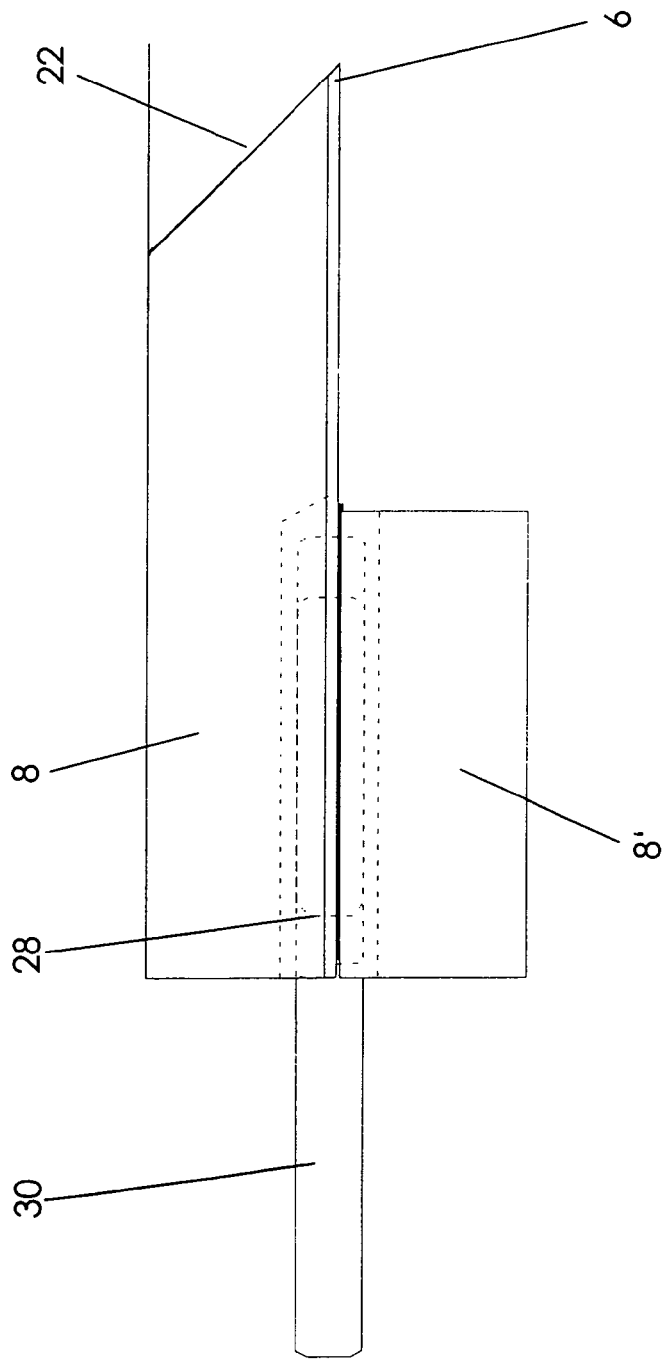

OPTICAL FERRULE

CROSS-REFERENCE TO RELATED APPLICATIONS

This is the first application filed for the present invention. This application is related to commonly assigned co-pending applications filed herewith bearing Ser. No. 10,625,905 entitled "Optical Connector Assembly", and Ser. No. 10/725,566 entitled "Encapsulated Optical Package", the specifications of which are hereby incorporated by reference.

TECHNICAL FIELD

This invention pertains to the field of connecting devices. More precisely, this invention relates to the field of optical ferrules.

BACKGROUND OF THE INVENTION

This invention relates to the optical coupling of light emitted, absorbed or altered by optoelectronic devices, such as photodetectors, light emitting diodes, lasers, vertical cavity surface emitting lasers (VCSEL), etc., with optical waveguides, such as optical fibers, planar waveguides, etc., which can be further coupled to standard optical connector types such as the MPO/MTP™ connector.

An optoelectronic chip, containing a device such as a VCSEL, is typically mounted in an electronic package where the direction of the light from the VCSEL is perpendicular (normal) to the surface of both the chip itself and the surface on which the electronic package has been placed. Electronic packages are typically placed on large 2-D flat printed circuit boards (PCBs), and these PCBs are typically stacked within a chassis with very narrow gaps between the PCBs. This type of structure requires that all the connections to and from the PCB enters and leaves from the PCB's edge, called the card-edge. Since the light from the VCSEL is emitted perpendicular to the PCB, a method would be desirable to direct the light off the edge of the PCB, and hence parallel to the flat surface of the PCB. The typical method used to achieve card-edge connections with light is to use a flexible-PCB bent at 90-degrees where one face of the flexible-PCB connects to the main PCB and the other face has the optoelectronic chip where the light from the VCSEL is directed parallel to the surface of the main PCB. The light is then butt-coupled into an optical fiber.

The bevel coupling method allows the optoelectronic chip to be placed in the conventional packages where the light is directed perpendicular to the PCB. The optical fiber is then beveled at 45-degrees and placed over the light beam such that the light is reflected at 90-degrees and propagates parallel to the PCB within the optical fiber. This method allows more conventional packaging and reduces the alignment tolerance because the length of the optical fiber is essentially laid over the flat surface of the PCB.

The method of embedding optical fibers in a block (primarily a silicon v-groove sandwich using two silicon chips to sandwich the optical fibers) to precisely hold optical fibers is very well known in the literature. Furthermore, the beveling of this block at a given angle (primarily at 45-degrees) to reflect light sideways out of the embedded optical fibers is also very well known in the literature. This is discussed in numerous prior-art patents, such as U.S. Pat. No. 4,900,118 granted Feb. 13, 1990, U.S. Pat. No. 6,004, 042 granted Dec. 21, 1999, as well as most of the cited references in these two US Patent Documents.

SUMMARY OF THE INVENTION

It is an object of the invention to provide an optical ferrule.

It is another object of the invention to provide an optical ferrule that will achieve a mechanical coupling of at least one optical fiber.

Yet another object of the invention is to provide an optical ferrule that will achieve an optical coupling of at least one optical fiber with an optical device.

This invention relates to the optical coupling of light emitted, absorbed or altered by optoelectronic devices, such as photodetectors, light emitting diodes, lasers, vertical cavity surface emitting lasers (VCSEL), etc., with optical waveguides, such as optical fibers, planar waveguides, etc., which can be further coupled to standard optical connector types such as the MPO/MTP™ connector. The invention is a unique ferrule assembly that can allow an interface between optoelectronic devices and standard optical connectors. According to one aspect, the invention facilitates the coupling procedure by using mechanical assemblies to hold the waveguides in contact with the optoelectronic devices on one end of the ferrule, and corresponding dowel pins to mate with the standard connector types on the other end of the ferrule. This ferrule does not require any other coupling agent, such as lenses, but must be sufficiently close to the optoelectronic device in order to maximize the coupling efficiency into (or out of) the waveguide (optical fiber). Both the ferrule and the optoelectronic assembly are particularly amenable to a one-step alignment process involving planar-on-planar (or stacked) 2-D alignment. The assemblies are stacked on top of each other and viewed from above to simultaneously observe features on both the ferrule and the optoelectronic assembly. The alignment process involves sliding the two assemblies (ferrule and optoelectronic assembly) with respect to each other on their co-incident 2-D surfaces. This procedure can be done passively (without energizing the optoelectronic assembly), and requires only one high resolution alignment step to be performed. This is contrary to other methods described in the prior art that use mechanical constraints, such as extra grooves, stop-walls, stand-offs, precision machining or precise pick-and-place methods to align ferrules to optoelectronic devices. It also supercedes older methods that rely on large optoelectronic devices to overcome slight misalignments of the optical fiber.

The optical ferrule has two opposite ends. The first end consists of the 45-degree bevel at the tips of the waveguides (optical fiber) and the second end is the flat-polish with alignment dowel pins. The 45-degree bevel at the tips of the waveguides (optical fiber) allows for side-coupling of light into the core of the waveguide (optical fiber) by using the 45-degree bevel as a mirror surface. The light is initially directed at 90-degrees to the longitudinal center axis of the optical fiber and travels through the cladding towards the center of the beveled tip. Total internal reflection at the 45-degree beveled tip forces the light to reflect at 90-degrees and couple along the longitudinal axis of the optical fiber. However, a metallic reflection coating can be applied to the beveled tip with an appropriate metal to enhance the coupling into the optical fiber. The flat-polish at the second end of the ferrule, along with the appropriate alignment dowel pins, allows a flat-polish (or angled polish) mating connector, such as the MPO/MTP™ parallel optical fiber connector, to mate with the other end of the waveguide (optical fibers) in the ferrule.

According to one aspect of the invention, there is provided a method for manufacturing an optical connector achieving a mechanical coupling, comprising:

embedding a length of at least one optical fiber in a body to form an assembly;

a first end of the assembly, removing a portion of the assembly to provide a beveled surface on a corresponding first end of the at least one optical fiber at which light is reflected for a side coupling;

at a portion of a side of the assembly near the first end, creating an optical surface to provide a flat coupling surface for the side coupling;

at a second end of the assembly, removing a portion of the assembly to provide a flat abutment surface including a corresponding second end of the at least one fiber;

providing at the second end of the assembly a mating structure for precision connecting with a complementary connector in which an optical waveguide is end-coupled with the at least one optical fiber.

According to a further aspect of the invention, there is provided an optical coupling assembly comprising a plurality of optical fibers embedded in a parallel arrangement in a body having a beveled end, a substantially flat side coupling surface near the beveled end and an opposite connector end, light being coupled between the coupling surface, the beveled end and the fibers, a package of optoelectronic elements disposed along a line, the package having a single planar window bonded to the coupling surface such that the optoelectronic elements are coupled with the fibers in a one-to-one manner, and a precision end-couple ferrule member provided at the connector end of the body for guiding a complementary ferrule member to end-couple fiber-to-fiber the plurality of fibers at the connector end.

According to yet a further aspect of the invention, there is provided an optical coupling assembly comprising a plurality of optical fibers embedded in a parallel arrangement in a body having a connector end, at least two alignment V-grooves in the body at the connector end, at least two dowel pin V-grooves in the body at the connector end, a cover member having corresponding opposite alignment and dowel pin V-grooves, at least two alignment pins bonded in the alignment V-grooves and registering the cover member to the body correctly, the alignment pins and the V-grooves being dimensioned such that the location of the dowel pin V-grooves on both the body and the cover member are located at the appropriate position, wherein the flat abutment surface can be polished and dowel pins can be later inserted into the dowel pin alignment V-grooves for guiding a complementary ferrule member to end-couple fiber-to-fiber the plurality of fibers at the connector end.

Preferably, the body has a beveled end opposite the connector end, light being coupled between a side coupling surface of the body, the beveled end and the fibers. Preferably, part of the cladding of the fibers is removed to improve light coupling.

To provide a ferrule compliant with the MPO/MTP™ standard, the fibers are centered at the connector end in a plane extending through an axis of the dowel pins.

It will be appreciated that each of the following features of the invention are advantageous:

1) The top half of the silicon v-groove chip that contains the optical fibers has been over-polished on the large 2-D surface such that the longitudinal length of the cladding of all the optical fibers has been slightly removed (between 0 and 25-microns). This allows a closer proximity to the core of the optical fibers.

2) Because of this "over-polishing" step, the flat surfaces of either silicon chip comprising the sandwich cannot be used as the reference interface. Neither flat surface will touch. The alignment pin v-grooves on either silicon chip are used to clamp onto the alignment pins thereby using the 4-points (or lines) of contact along the dowel pins to properly locate the dowel pin v-grooves which will eventually contain the external dowel pins for mating with a standard optical connector.

3) Because the alignment pins are recessed with respect to the flat abutment surface and the external dowel pins are not initially inserted into the assembly, the flat abutment surface can be polished without obstructions to prepare the surface for mating with a standard optical connector.

4) Alternatively, only one set of dowel pin v-grooves may be used to space the sandwich while the bonding of the chips is done. By controlling the placement of the adhesive so that the dowel pins are not bonded, the dowel pins can be removed once the bonding agent has set. This allows the flat abutment surface to be polished without obstruction to prepare the surface for mating with a standard optical connector. The pins can then be reinserted and bonded in place for a male connector, or left out for a female connector.

It will be appreciated that a ferrule comprising such a sandwich, whether made from silicon chips or plastic molded parts, is useful for optical connectors of a variety of types, e.g. a patch cable or an optoelectronic component connector having a beveled side coupling end as in the preferred embodiments described hereinbelow.

BRIEF DESCRIPTION OF THE DRAWINGS

Further features and advantages of the present invention will become apparent from the following detailed description, taken in combination with the appended drawings, in which:

FIG. 10a is a 3D perspective view of an alternative embodiment to the first ferrule that shows the temporary use of the external dowel pins to locate the second assembly before back polishing;

FIG. 11 is a to-scale side view of the completed ferrule assembly described in FIG. 9;

It will be noted that throughout the appended drawings, like features are identified by like reference numerals.

It will be noted that throughout the appended drawings, like features are identified by like reference numerals.

DETAILED DESCRIPTION OF THE PREFERRED EMBODIMENT

The parallel optical ferrule is a mechanical structure used to interface between a parallel optical fiber ribbon cable and an array of optoelectronic devices, such as a vertical cavity surface emitting laser (VCSEL) array or photodetector array.

The ferrule has two ends; one end interfaces with the optoelectronic device and the other end interfaces with a standard connector assembly such as the MPO/MTP™ parallel optical connector. Within the ferrule is a linear array of optical fibers that optically connects both ends of the ferrule.

The first end of the ferrule is polished at a 45-degree angle to create a reflective glass-air interface at the fiber tips. This interface can reflect light at 90-degrees by either total internal reflection (TIR) when the glass-air interface is preserved, or by depositing a reflective metal layer on the exposed tips of the fiber. The reflective metal layer may be made of gold, silver, etc. The use of a reflective layer allows for the OE component and ferrule to be provided with a protective coating without interfering with the light coupling.

Light directed at the 45-degree tips of the optical fiber will be reflected and coupled into the optical fiber orthogonal to the initial direction. In this situation, light will pass though the side of the optical fiber, through the cladding, and reflect off the 45-degree tip, due to TIR or the metallic surface, into the core of the optical fiber. Conversely, when light is already in the core and traveling towards the 45-degree polished tip, it reflects off the 45-degree tip, due to TIR or the metallic surface, and is directed normal to the optical fiber passing through the cladding and out of the side of the optical fiber.

The other end has a surface that can accept an end-coupled, or butt-coupled, mating connector such as a standard flat-polished MPO/MTP™ parallel optical connector. Preferably, the ferrule includes 2 positioning dowel-pins, one on either side of a linear array of optical fibers. The face of this structure is polished to optical quality.

First Preferred Embodiment of the Invention—Silicon v-Groove

The parallel optical ferrule is comprised of 8 elements, one of which is used as a sacrificial element and is not present in the final assembly. The elements are described as: a first silicon v-groove chip, a second silicon v-groove chip, 2 internal alignment dowel pins, 2 external mating dowel pins, optically transparent epoxy, protective epoxy, parallel optical fiber ribbon, and a sacrificial cover plate.

Figure 1:
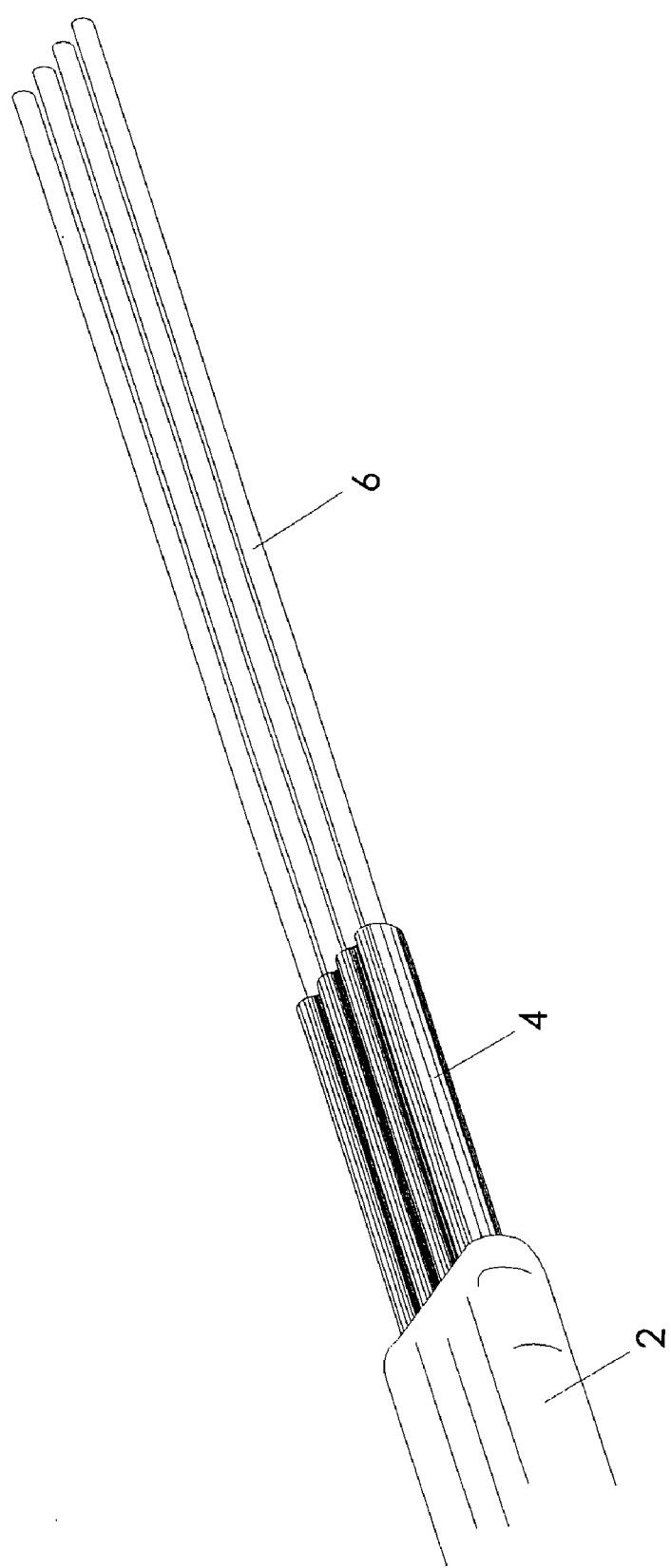
FIG. 1 is a 3D perspective view which shows four optical fibers.

A parallel optical fiber ribbon (2) typically has several optical fibers (6) within protective polymer jackets (4) that keep them roughly pitched at 250-microns, however this is not precise. The end portions, approximately 2-cm long, of the protective polymer jackets of the optical fiber ribbon (6) are stripped and clean—using standard means—to produce 2-cm long segments of separated parallel optical fibers (i.e.: only the glass), still roughly pitched at 250-microns but not touching each other. The segment of bare optical fiber remains part of the ribbon cable, as shown in FIG. 1.

Figure 2:
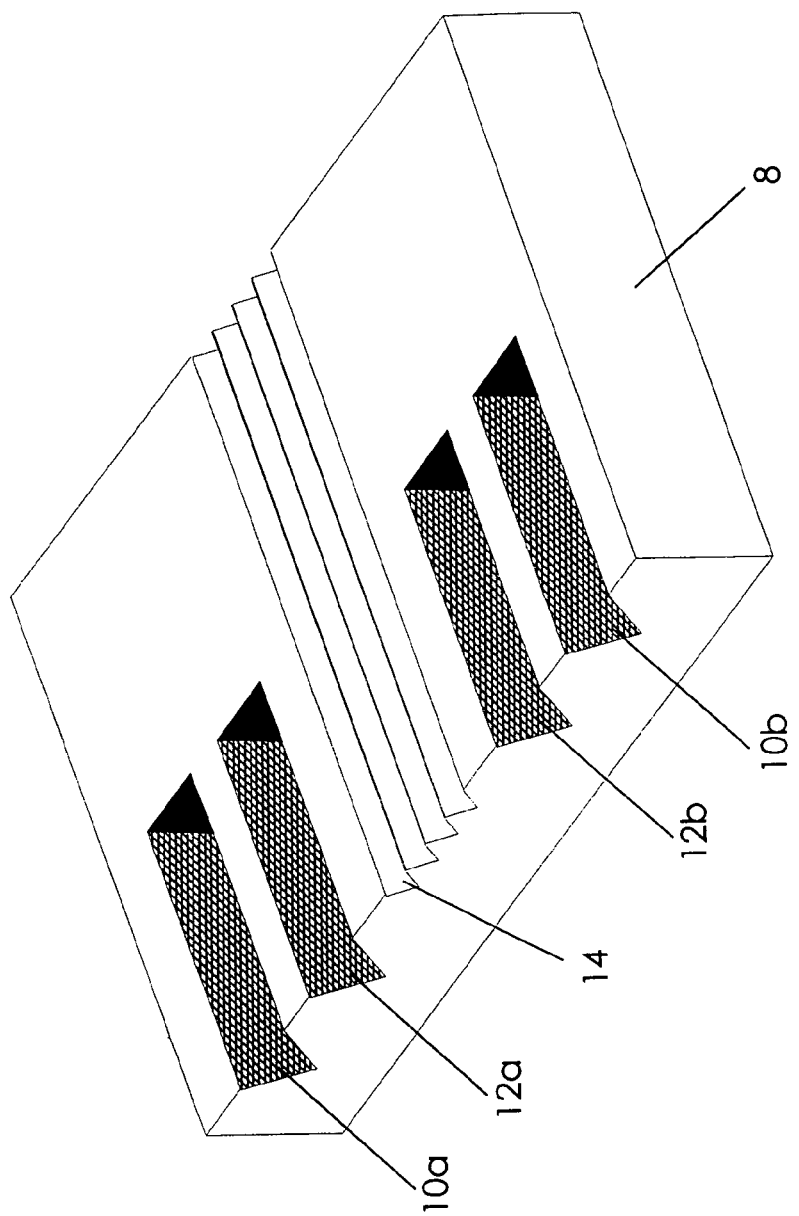
FIG. 2 is a 3D perspective view which shows a first assembly which comprises two alignment V-grooves (large grooves) in parallel with 2 dowel pin V-grooves (large grooves) in parallel with four optical fiber v-grooves (small grooves)
Figure 3:
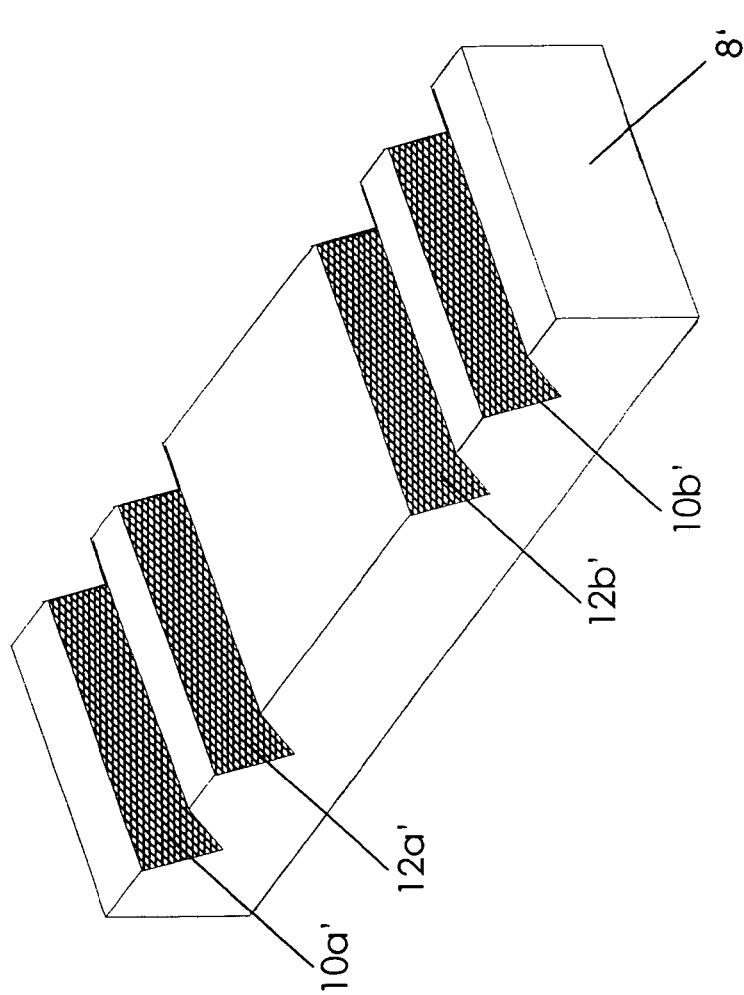
FIG. 3 is a 3D perspective view which shows a second assembly which comprises two alignment V-grooves (large grooves) in parallel with 2 dowel pin V-grooves (large grooves)

The first silicon v-groove chip (8) in FIG. 2 and second silicon v-groove chip (8') in FIG. 3 are each chemically etched on one of their large surfaces to produce v-shaped grooves in the silicon. The chips are on the order of 1-cm×1-cm×0.2-cm and 1-cm×0.5-cm×0.2-cm in size, respectively.

The process of creating v-grooves in crystalline silicon is well known and described in the literature. The v-groove structure is used in this case to maintain four essential features for providing a standard connector. Preferably, a first essential feature is that the optical fibers are pitched from each other at precisely 250-microns, a second essential feature is that the optical fibers remain in precisely the same plane. Preferably, a third essential feature is that the axial center of the alignment dowel pins are located in the same plane as the axial center of the optical fibers, and the fourth essential feature is that the dowel pins and optical fibers mate properly with standard parallel optical connectors such as the MPO/MTP™ connector.

The large v-grooves in the first silicon v-groove chip (8) define the position of the internal alignment dowel pin v-grooves (12a, 12b), the position of the external mating dowel pin v-grooves (10a, 10b) and the position of the parallel optical fiber v-grooves (14) all relative to each other. Preferably, the dimensions of the parallel optical fiber v-grooves ensure that the optical fibers are completely inside their respective grooves and flush with the surface of the first silicon v-groove chip (to form a 3-point contact). Preferably, the external mating dowel pin v-grooves ensure that the axial centers of the external dowel pins lie in the same plane as the axial centers of the optical fibers. The external mating dowel pin v-grooves are located on the side of the chip where the standard MTP/MPO™ connector will be connected. The second silicon v-groove chip (8'), shown in FIG. 3, defines the position of the corresponding internal alignment dowel pin v-grooves (12a', 12b') and the position of the external mating dowel pin v-grooves (10a', 10b').

Figure 12:
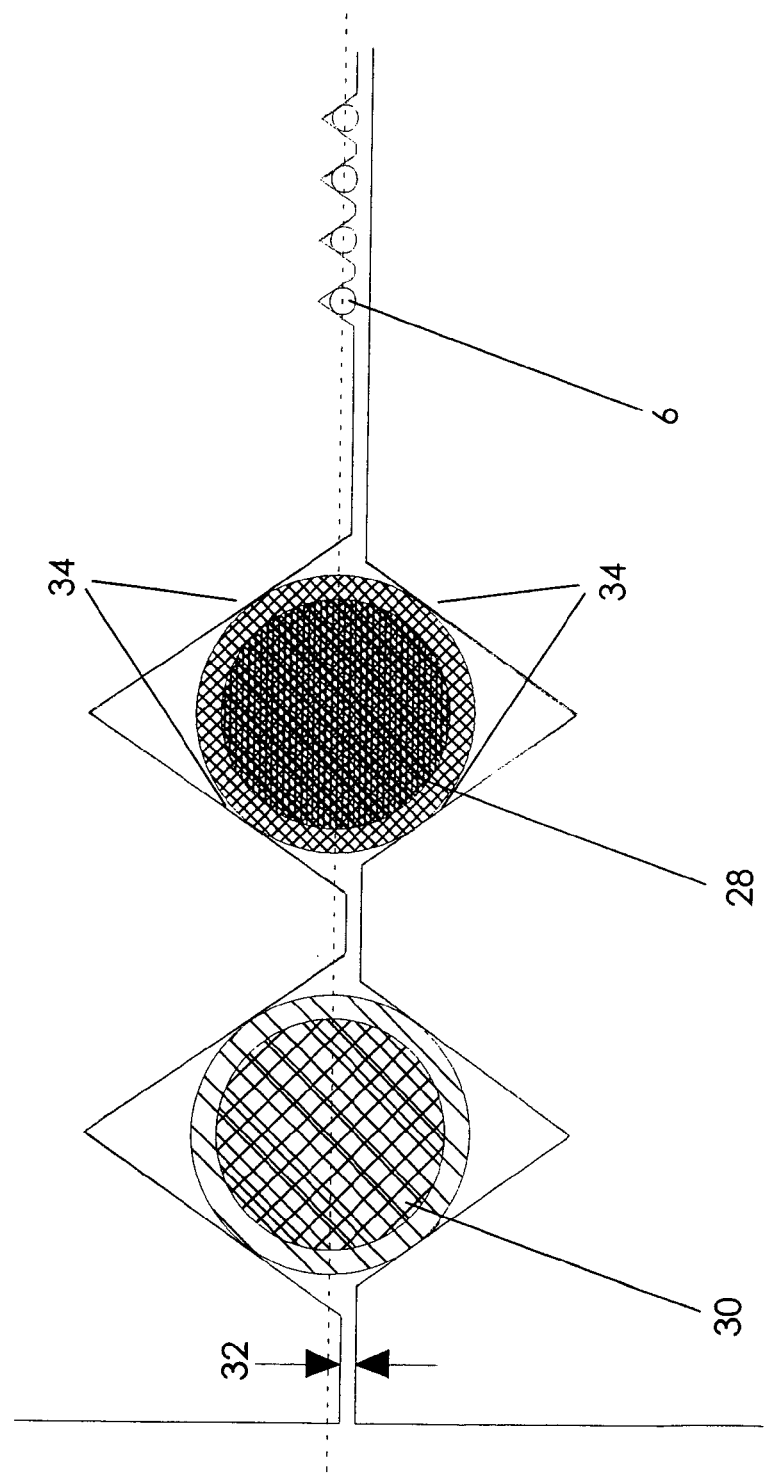
FIG. 12 is a view of the connector side of the ferrule assembly showing the internal alignment pins, the external dowel pins and the optical fibers lying in the same plane and the associated gap between first and second assembly.

Since the optical fibers in the optical fiber v-grooves of the first silicon v-groove chip are flush with the surface, their axial centers lie 62.5-microns below the surface. Therefore, the external mating dowel pin v-grooves on the first silicon v-groove chip must be 62.5-microns deeper than those on the second silicon v-groove chip. This arrangement maintains the axial centers of the external mating dowel pins in the same plane as the axial centers of the optical fibers as shown in FIG. 12. To reduce number of masking steps when making the silicon v-grooves chips, the internal alignment pin v-grooves will typically be at the same depth as the external mating dowel pin v-grooves, but this does not have to be the case.

Figure 4:
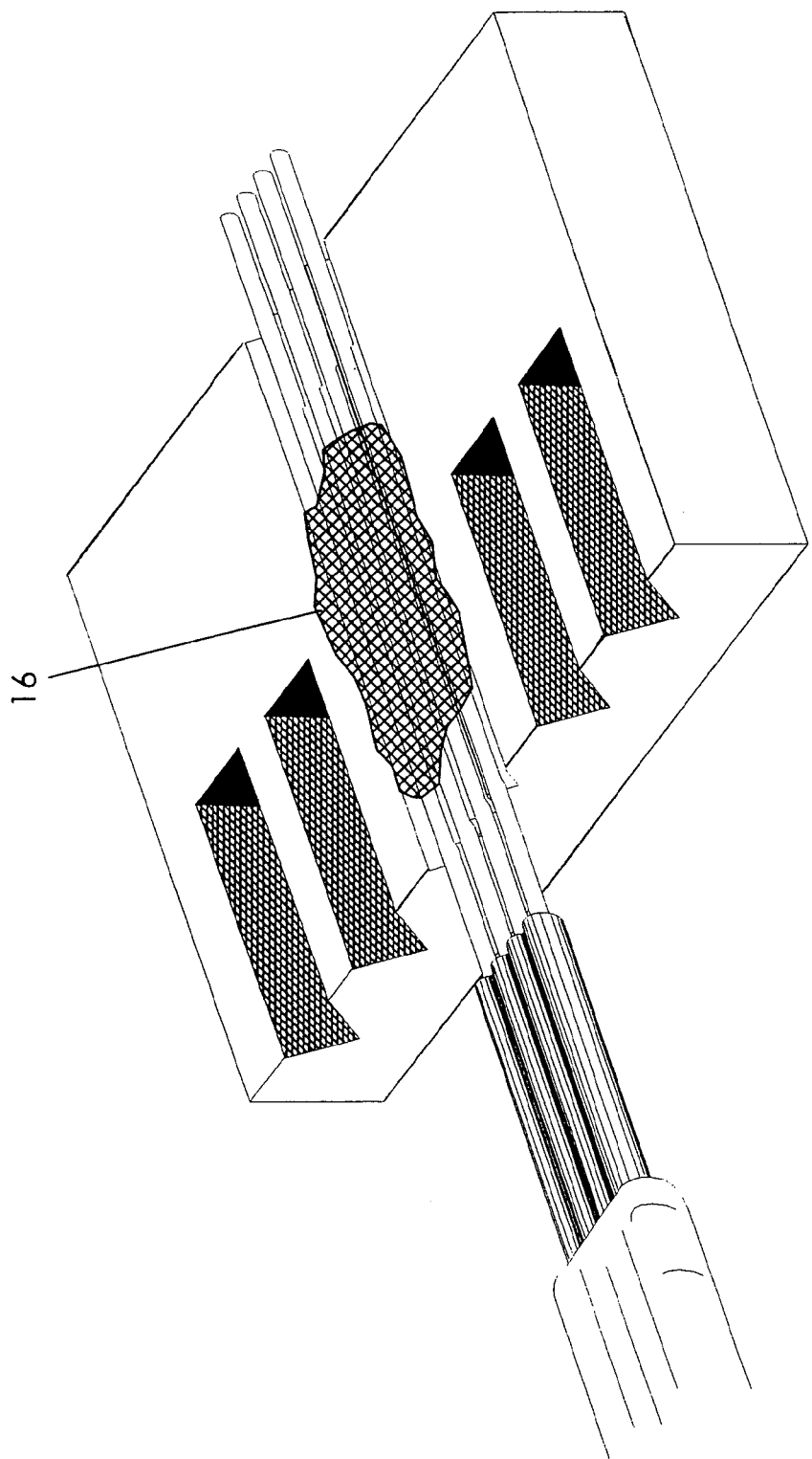
FIG. 4 is a 3D perspective view of four optical fibers placed into the small v-grooves of the first assembly with a coating of transparent epoxy.

The first silicon v-groove chip, the optical fiber, and a small quantity of transparent optical epoxy (16) are now assembled in FIG. 4. The optical fibers (6) are placed in the v-grooves with the ends protruding past the first silicon v-groove chip (8), the other end still part of the ribbon cable.

Figure 5:
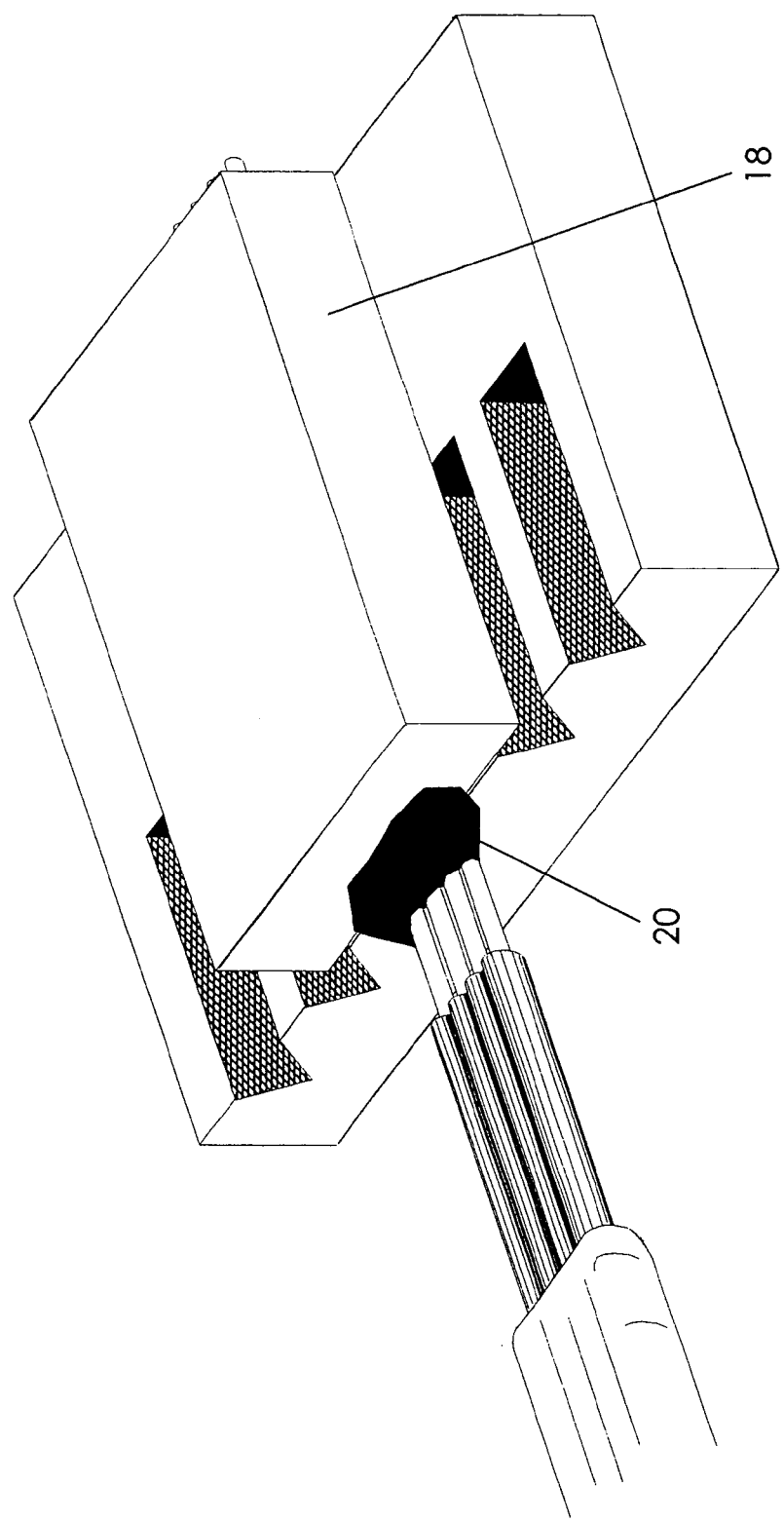
FIG. 5 is a 3D perspective view of an intermediate assembly which comprises an epoxy flattened using a cover plate (preferably glass) over the first assembly of v-grooves and a second epoxy used to coat the tips of the protruding optical fibers.

A cover plate (18) is placed over the optical fibers in the v-grooves and pressed together to sandwich the optical fibers in place as shown in FIG. 5. The epoxy is then cured.

The ends of the optical fibers are coated with a small amount of protective epoxy (20) to protect them during the polishing process. Once this protective epoxy has hardened, the ribbon cable is broken away leaving the sandwiched optical fiber protruding from both ends.

Figure 6:
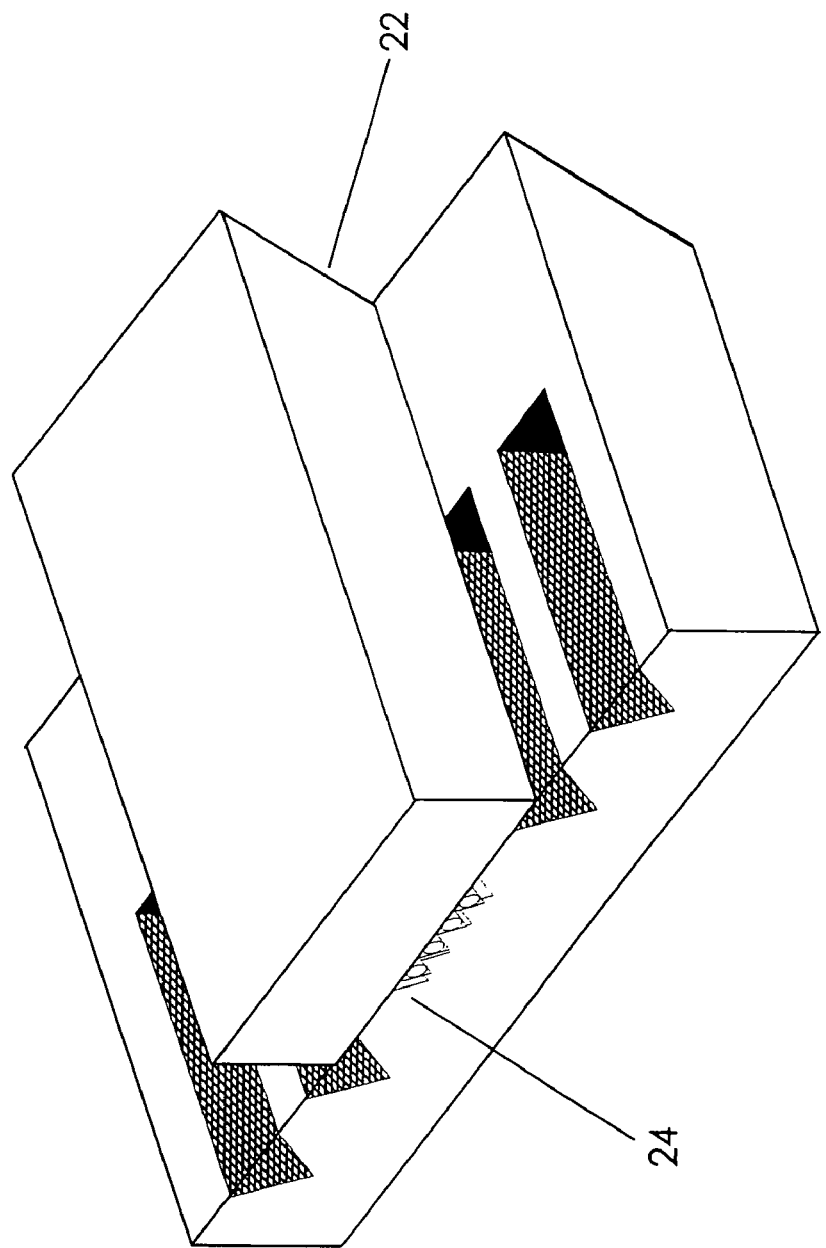
FIG. 6 is a 3D perspective view of the intermediate assembly where one end is polished at a predetermined angle and the other end is polished flat.

This intermediate ferrule is then placed on a polishing machine such that it is held at a 45-degree angle to the surface of the polisher with the corner of the first silicon v-groove chip polishing first and progressively towards the cover plate. This creates the 45-degree angled polish of the optical fibers (22) as shown in FIG. 6. The intermediate ferrule is then placed on a polishing machine such that the opposite side is polished flat (24) to create a flat polish of the optical fibers for the standard optical connector. However, this flat polishing step can be deferred till later in the process. Preferably, standard lapping and polishing techniques are applied, including progressively finer grits of polishing paper, correct timing, appropriate slurry mixtures, and a method of holding the parts in a rigid manner.

A thin metallic coating can be applied to the 45-degree beveled surface to create a mirrored surface on the inside region of the optical fiber. The metallic coating can be made of gold, silver, etc.

The rest of this application will assume no metallic coating, but there is no difference to the procedure if one is included at this point.

To remove the cover plate, several methods could be used. The cover plate could be made of a material that would not adhere to the epoxy or silicon v-groove chip. The plate could then be mechanically removed after the epoxy had secured the optical fibers in place. This may or may not result in a suitable optically flat surface, and polishing (buffing) still might be required. The cover plate might also be made of a material that could be chemically dissolved, leaving the fibers, epoxy and glue unaffected. This also may or may not result in a suitable optically flat surface, and polishing (buffing) still might be required.

Figure 7:
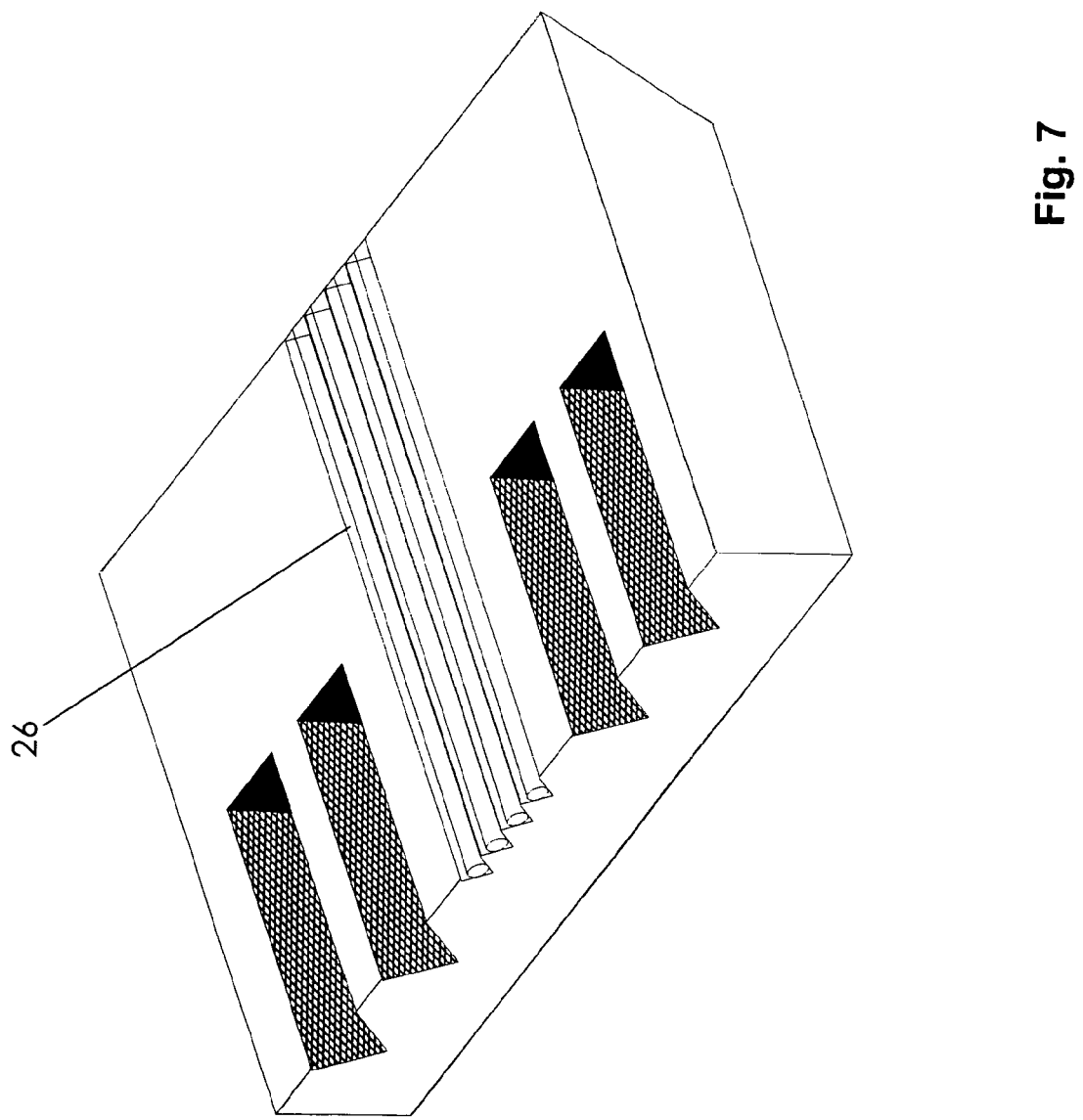
FIG. 7 is a 3D perspective view which shows the intermediate assembly where the glass plate has been removed and the remaining large surface is polished flat.
Figure 13A:
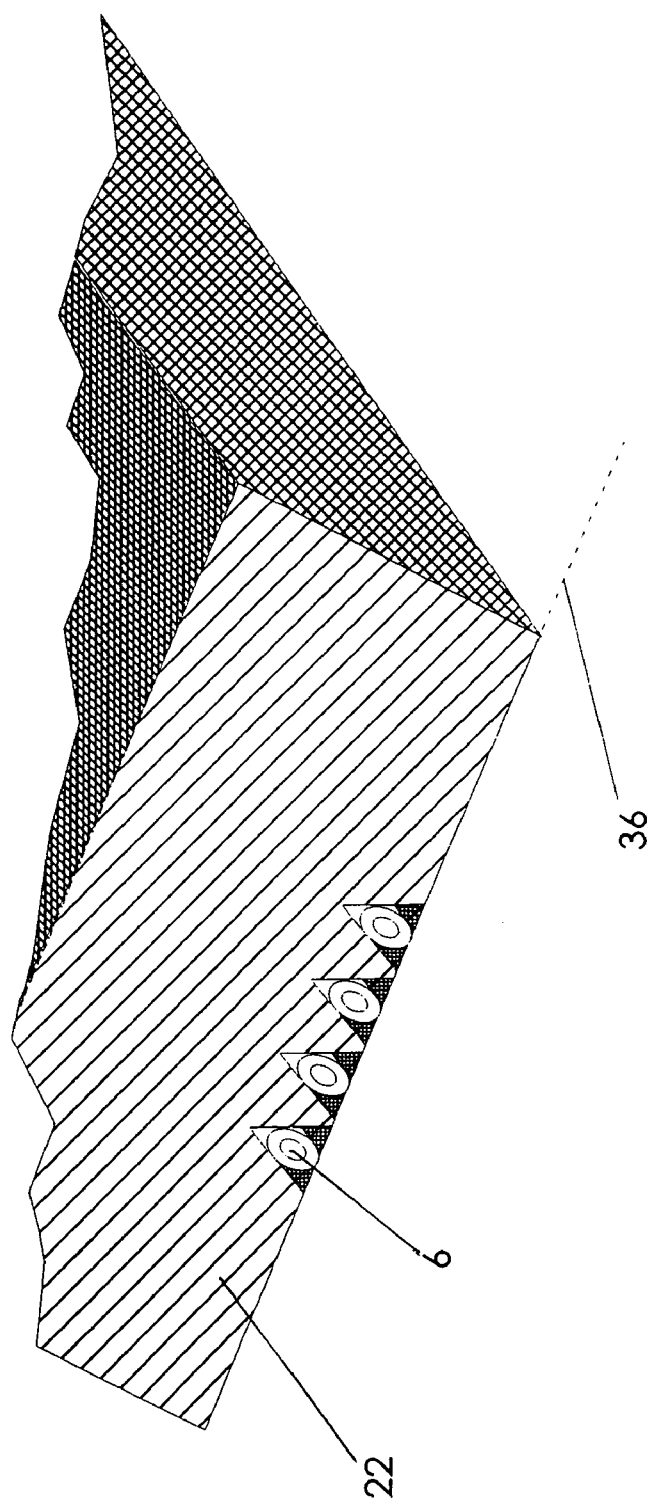
FIG. 13a is a 3D perspective front view of the ferrule assembly showing the removal of only the cover plate to expose the optical fibers along their respective v-grooves.
Figure 13B:
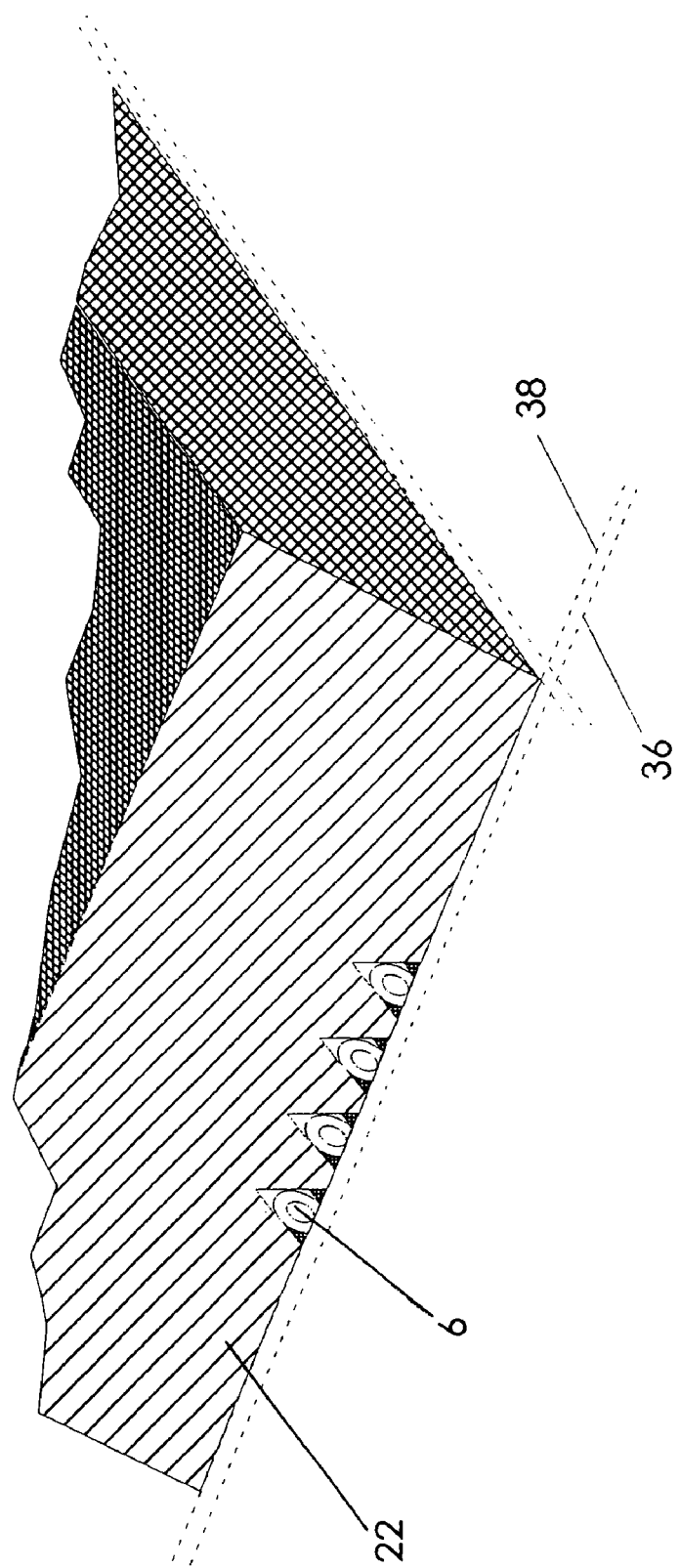
FIG. 13b is a 3D perspective front view of the ferrule assembly showing the removal of the cover plate and an over-polish of the optical fibers along one side to expose and gain proximity to the optical core of the optical fibers.

The preferred method will assume that the cover plate is removed by polishing. The intermediate assembly is then placed on a polishing machine such that the large exposed surface of the cover plate is in contact with the polishing surface. The cover plate is then lapped and polished until it has been completely worn away (26) leaving only the first silicon chip with optical fibers embedded in optical epoxy within the v-grooves, as shown in FIG. 7. A "perfect-polish" is obtained when the cover plate is entirely removed without polishing the silicon chip to expose the optical fibers from the side (36) as shown in FIG. 13a.

However, during the polishing step to remove the cover plate, an "over-polish" (38) can be applied to the surface. Over-polishing creates a flat side along the outside the optical fibers in the v-grooves. This is advantageous because it allows the light to be coupled closer to the core of the optical fiber, resulting in higher coupling efficiency. The over-polish also allows a more flexible tolerance during the polishing step; assuming a 1-cm×1-cm surface area silicon chip, a worst case tilt angle of 0.36-degrees in one direction and 0.65-degrees in the other can exist over the optical fiber array before damage to the core results.

Figure 8:
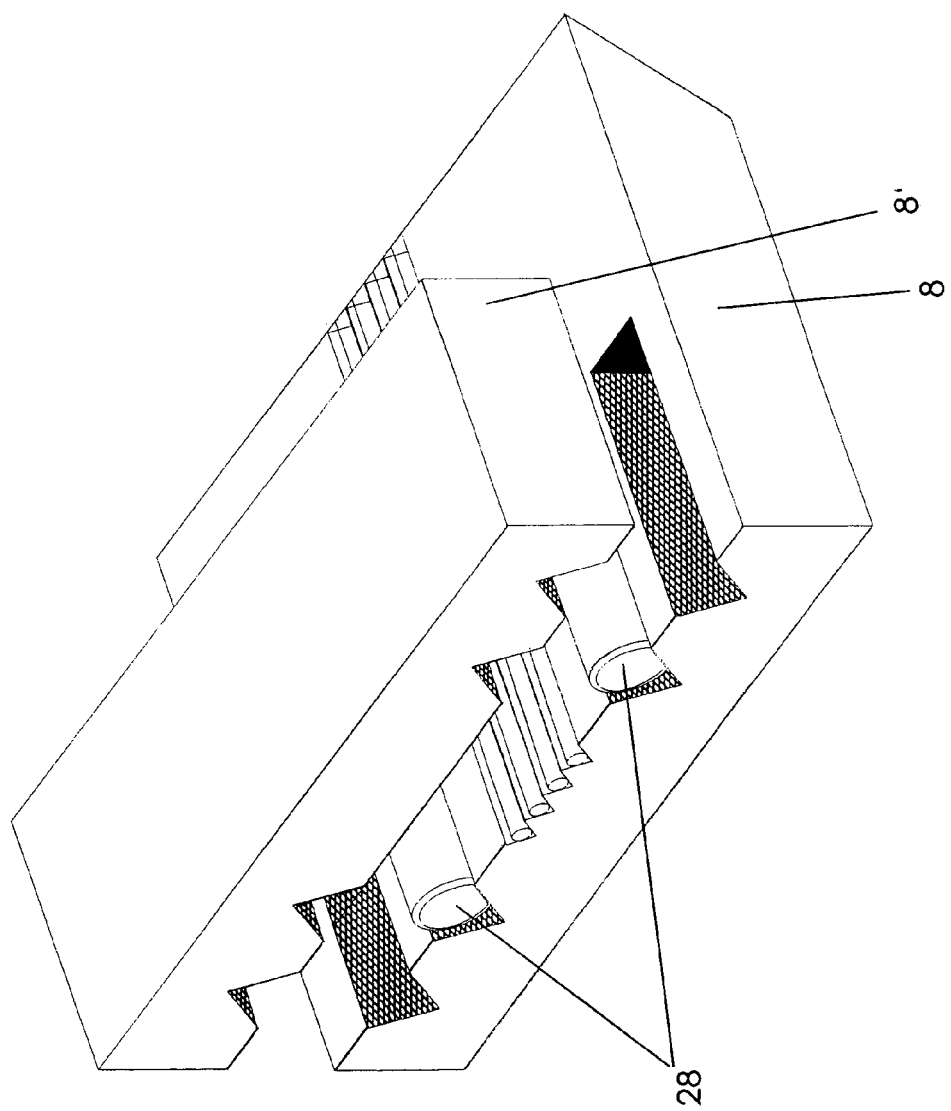
FIG. 8 is a 3D perspective view which shows the insertion of the alignment pins in their respective alignment v-grooves and the positioning of the second assembly over the first assembly using the alignment pins as reference.

The second silicon v-groove chip (8') is now aligned to the first silicon v-groove chip (8) using the internal alignment dowel pins as shown in FIG. 8. A small amount of epoxy is placed on the first silicon v-groove chip and the internal alignment dowel pins (28) are placed in their respective grooves and both chips are used to sandwich the dowel pins in place. A close-up view of an internal alignment dowel pin in the internal alignment v-groove is shown in FIG. 12 and shows how the silicon chips contact the dowel pin in 4 locations (34). This ensures that the external mating v-grooves of both the first and second silicon v-groove chip are located at the proper position. Due to the contact of the internal alignment dowel pins within their respective v-grooves, a small gap (32) exists between the flat polished surface of the first (8) and second (8') silicon v-groove chips which further aids the process of "over-polishing" by not requiring direct contact between the two chips.

Figure 9:
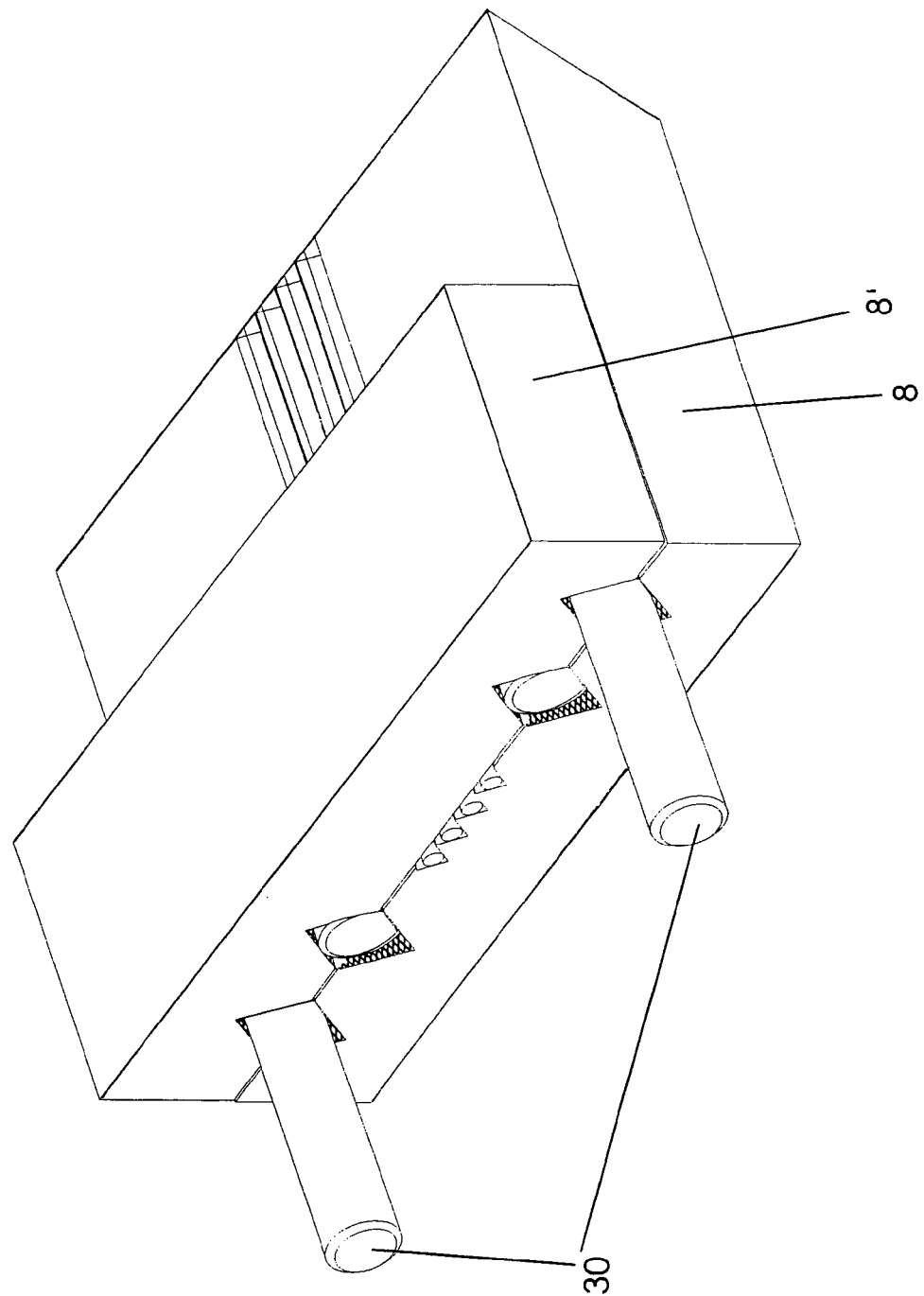
FIG. 9 is 3D perspective view of the insertion of the external dowel pins into the dowel pin v-grooves to complete the ferrule assembly (as a male type connector)
Figure 10B:
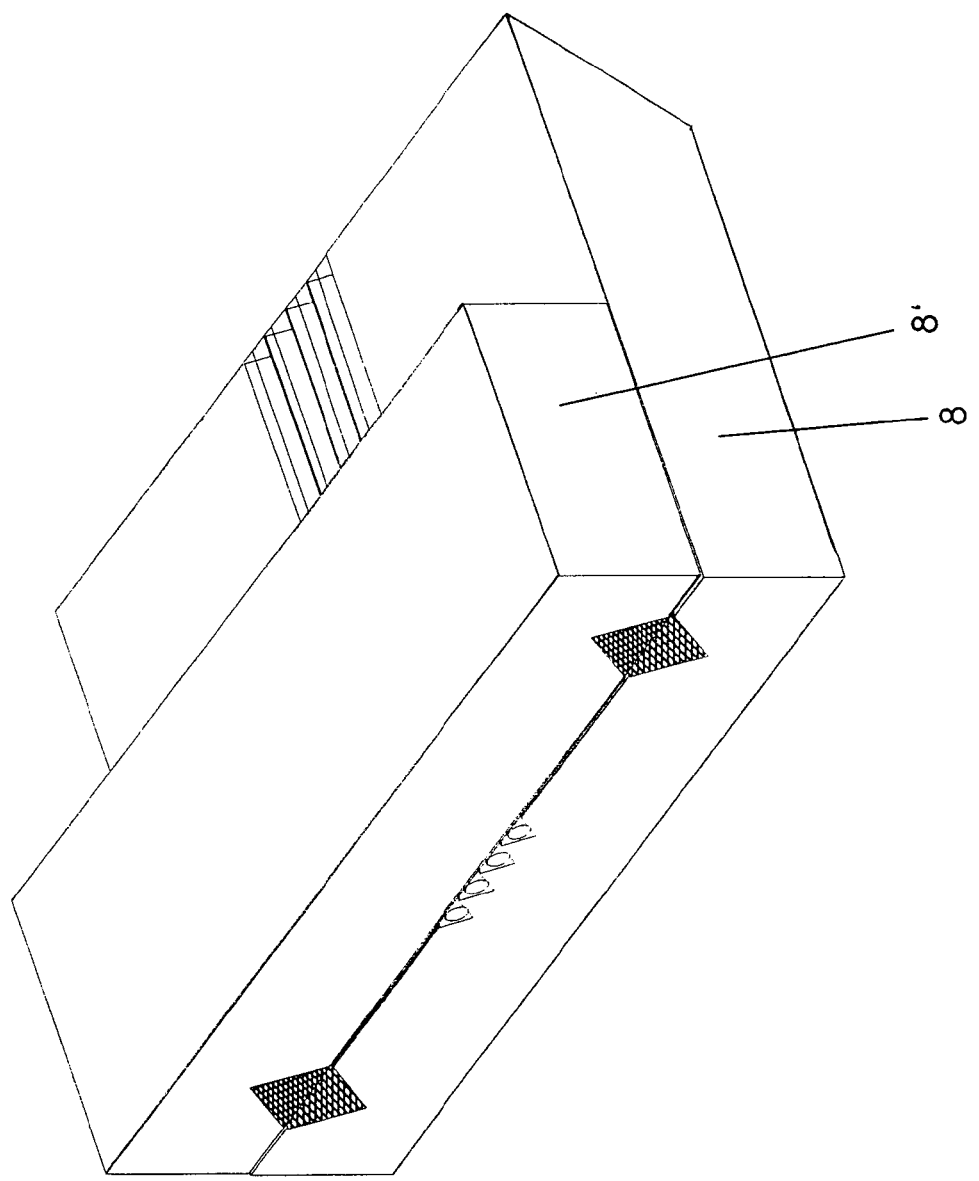
FIG. 10b is a 3D perspective view of an alternative embodiment to the first ferrule that shows the removal of the external dowel pins and the subsequent back polish of the connector side of the ferrule assembly.

Once the assembly in FIG. 8 has been assembled, a flat polish of the optical fibers on the standard optical connector side can be done (or done again—depending on the procedure above) before the external mating dowel pins (30) are inserted. This provides an optical quality surface for mating with a standard optical connector such as the MPO/MTP™. The external mating dowel pins can be left out (for a female type ferrule) or inserted and glued (for a male type ferrule) as shown in FIG. 9.

Second Preferred Embodiment—Molded Plastic

The structure used to hold the optical fibers may be fabricated from other materials and other assembly methods could be used. The mechanical structure that holds the optical fibers in the same plane and pitched 250-microns from each other as well as the two dowel pins can be based on precision micro-molding techniques of plastic as described in the literature.

This version of the parallel optical connector is comprised of 5 elements. The elements are described as a first injection-molded plastic ferrule, a second injection-molded plastic ferrule, epoxy, dowel pins, and parallel optical fiber ribbon.

Figure 14:
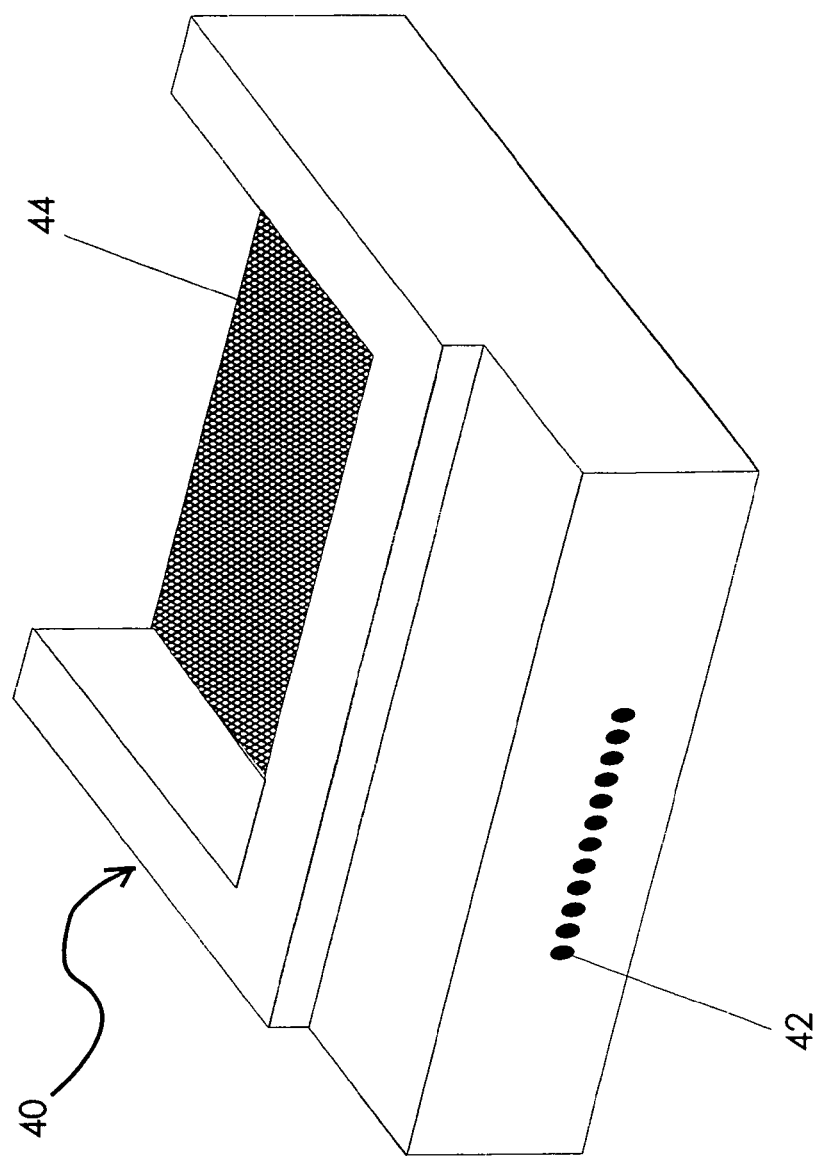
FIG. 14 is a 3D perspective view of the first part of another embodiment of the invention.

The first injection-molded plastic ferrule (40) is on the order of 1-cm×1-cm×0.3-cm in size, as shown in FIG. 14. It is a hollow plastic box with the back and top sides open (44). The front side has a linear array of 125-micron diameter holes pitched at 250-microns (42). The holes bore into the plastic approximately 0.05-cm and are used to align the tips of the optical fibers (6). Inside the box, a flat surface is used to keep the optical fibers equal or higher than the array of holes. The other interior sides of the box are tapered towards the array of holes to better guide the fibers into the holes during their insertion.

Figure 15:
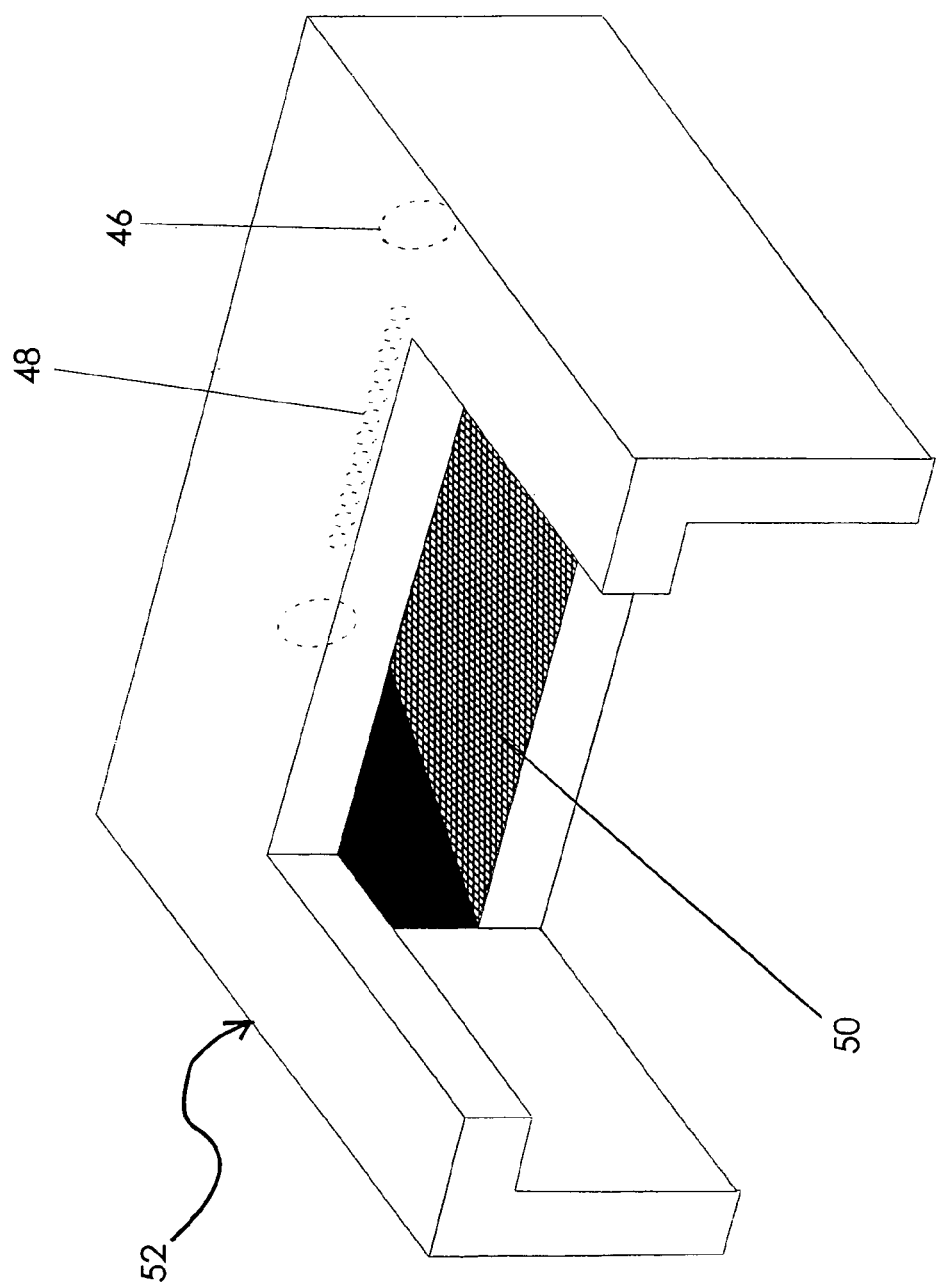
FIG. 15 is a 3D perspective view of the second part of another embodiment of the invention.
Figure 16:
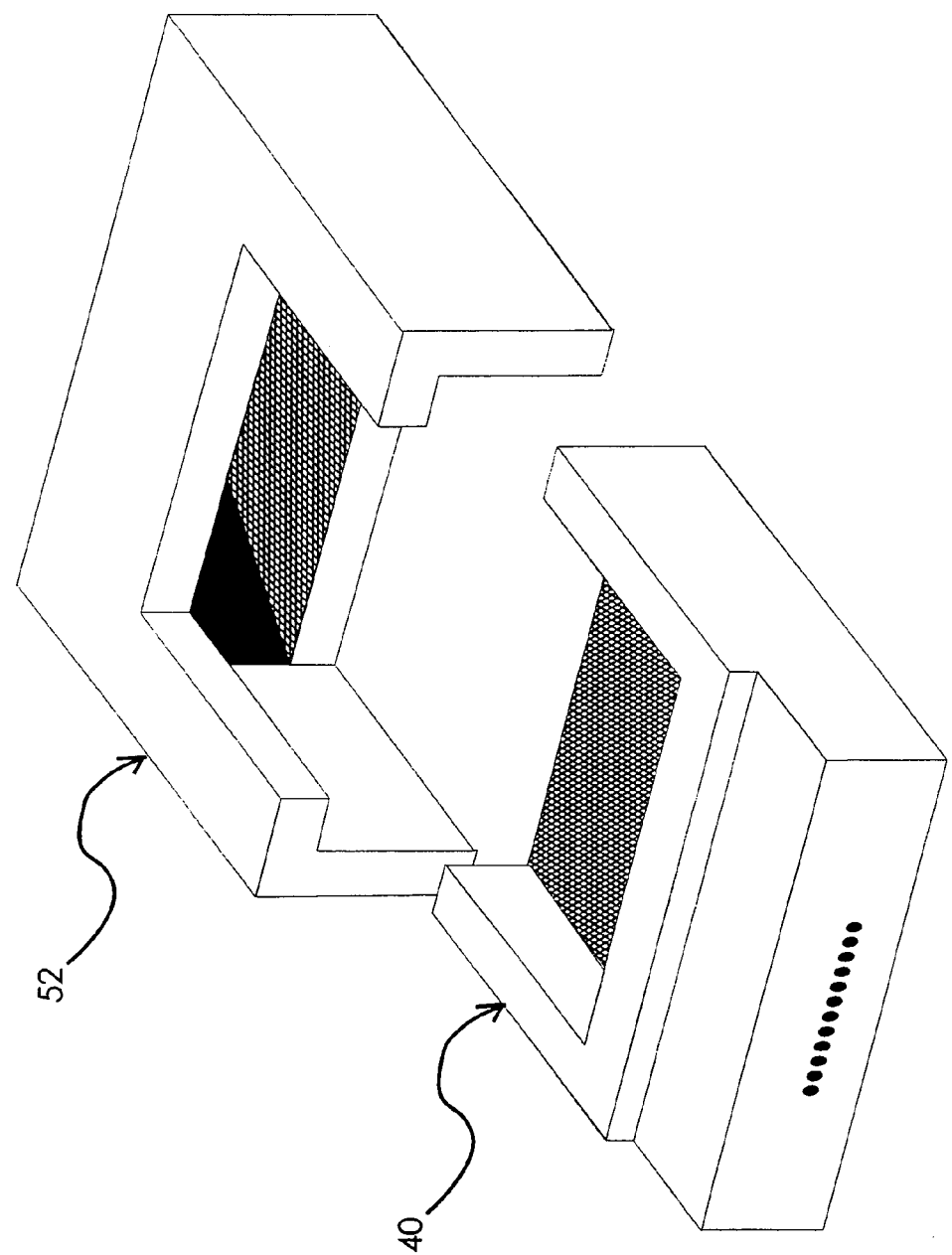
FIG. 16 is a 3D perspective view of the first part and the second part.
Figure 21:
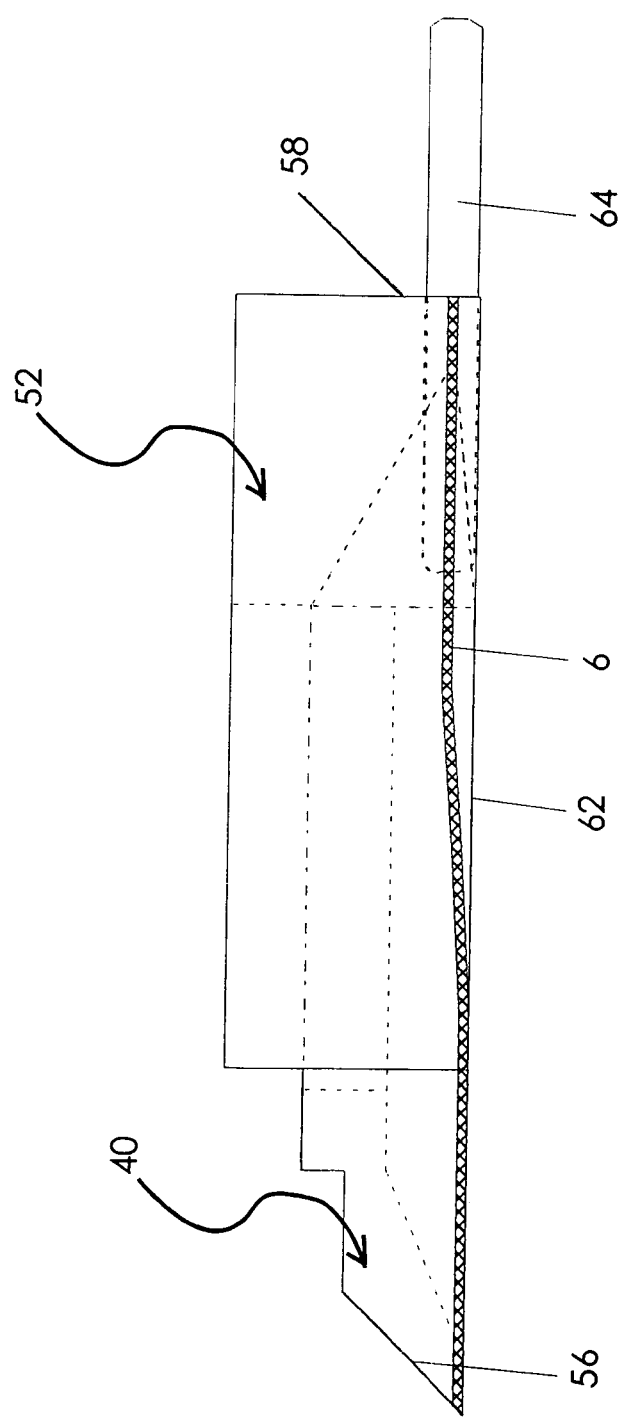
FIG. 21 is a to-scale side view of the completed second embodiment of the invention as described in FIG. 20.

The second injection-molded plastic ferrule (52) is shown in FIG. 15 and is very similar to the first except that it is slightly larger, in order to mate to the first ferrule as shown in FIG. 16. The second ferrule has two extra dowel pin holes (46) located on either side of the linear array of 125-micron diameter holes pitched at 250-microns (48). The dowel pin holes (46) are used to mate with standard optical connectors such as the MPO/MTP™. One additional characteristic of the second ferrule is that the array of 125-micron holes is shifted laterally upwards with respect to the 125-micron holes of the first ferrule. This results in slightly bent optical fibers within the ferrule assembly, but is required so that the bottom surface can be polished flat and still accommodate the dowel pins as shown in FIG. 21.

A parallel optical fiber ribbon (2) typically has several optical fibers within the same plastic coating that keep the fibers roughly pitched at 250-microns, however this is not precise. The end portion, approximately 3-cm long, of the optical fiber ribbon is stripped and cleaned of its plastic coating—using standard means—to produce a 2-cm long segment of separated parallel optical fibers (i.e.: only the glass). The segment of bare optical fiber remains part of the ribbon cable as shown in FIG. 1.

Figure 17:
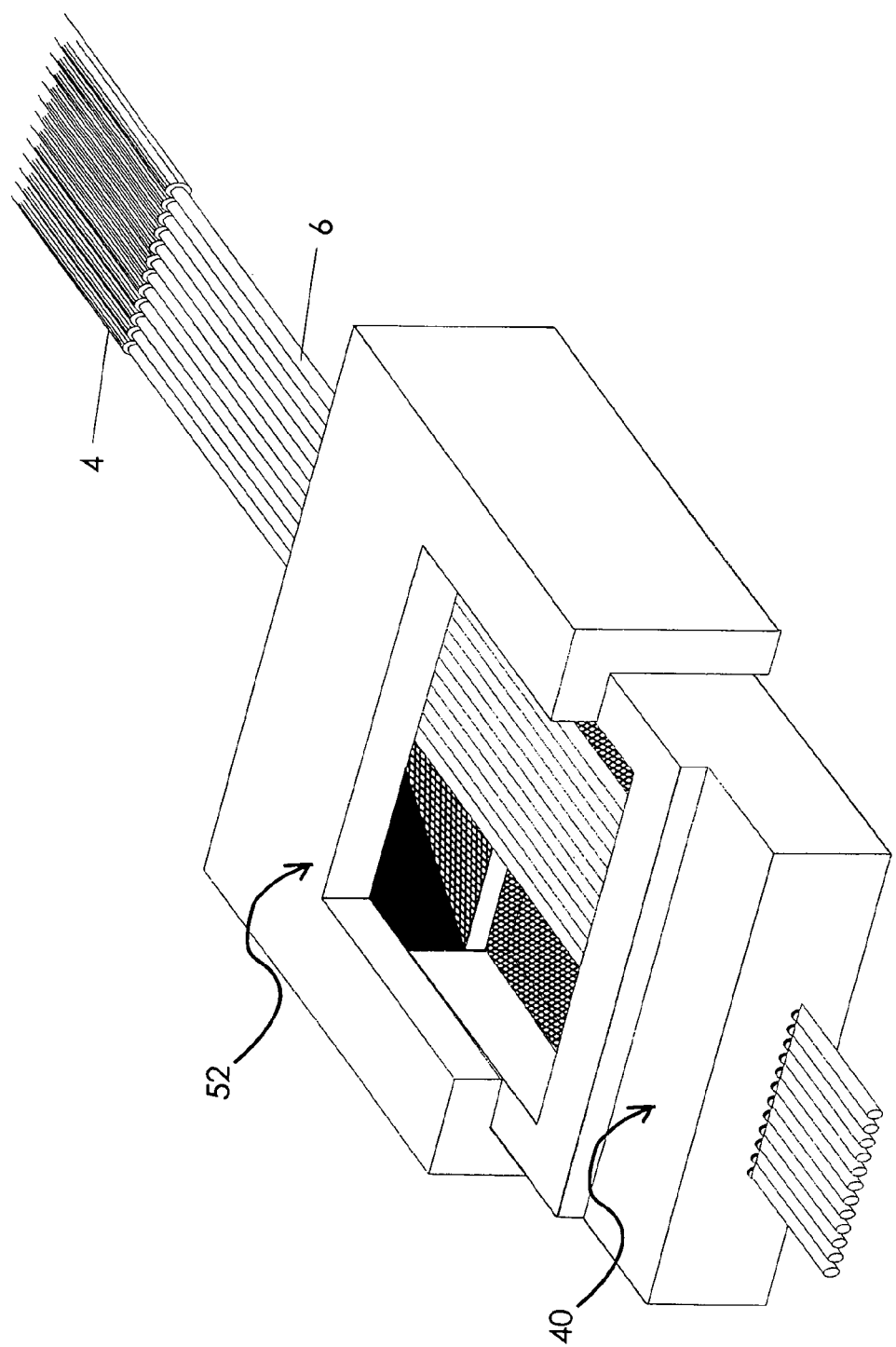
FIG. 17 is a 3D perspective view of the first part mating with the second part with a plurality of optical fibers.

The array of bare optical fibers (6) is inserted into the front side of the second plastic ferrule and the back side of the first plastic ferrule as shown in FIG. 17. The ferrules are pushed together with the optical fibers protruding from both ends.

Figure 18:
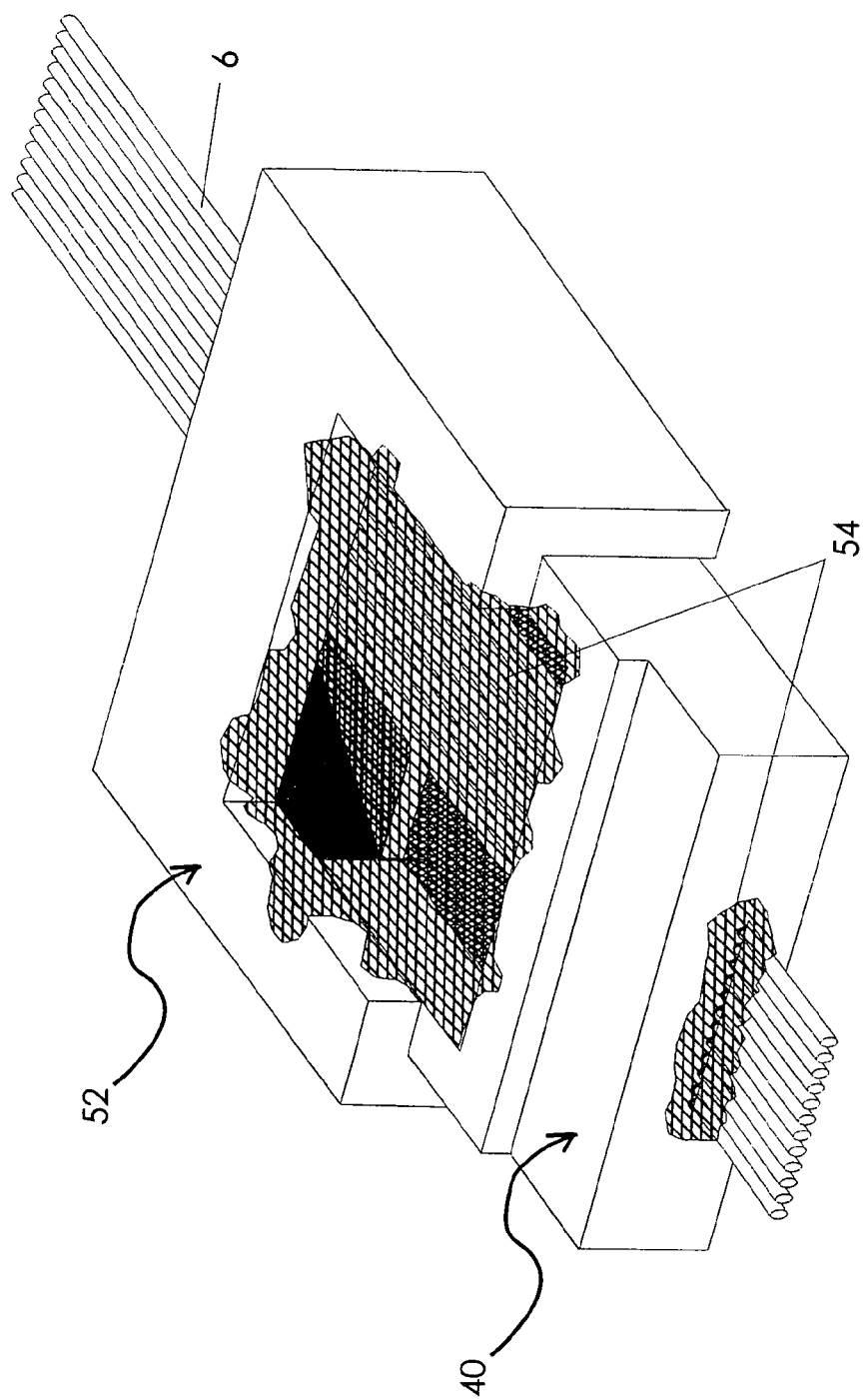
FIG. 18 is a 3D perspective view of an intermediate assembly consisting of the first part mated with the second part with a plurality of optical fibers where a bonding substance has been injected into the first and second parts.

Epoxy (54) is then injected into the injection opening (44 and 50) and the optical fibers are pushed and pulled back and forth to ensure that the epoxy has well coated all the fibers within the array of holes. Epoxy is then applied to the outside of the arrays of holes where the optical fibers are protruding. The epoxy is then cured, by heat, time, or UV light, as shown in FIG. 18.

Figure 19:
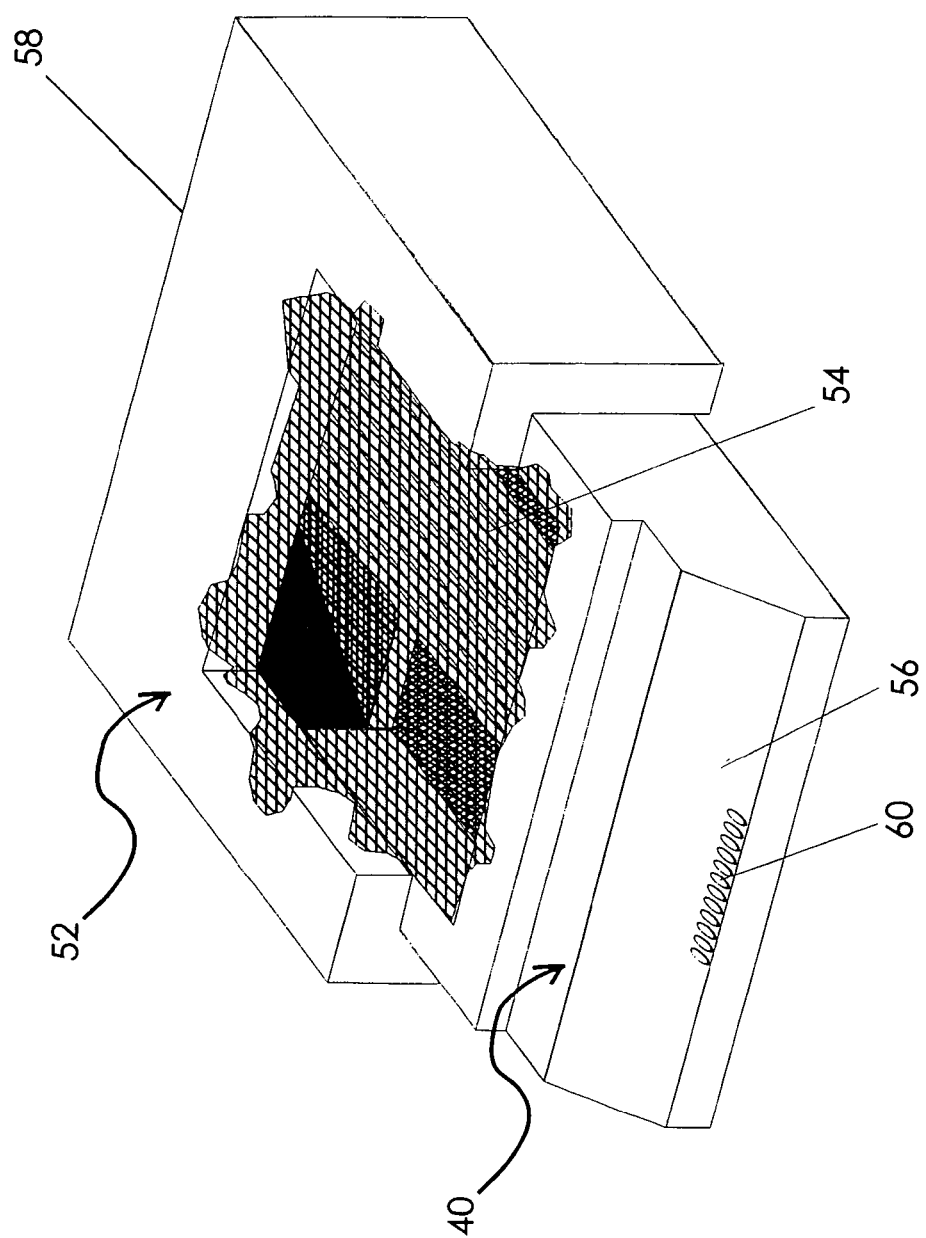
FIG. 19 is a 3D perspective view of the intermediate assembly where one end has been polished at a predetermined angle and the other end is polished flat.

The assembly is then placed on a polishing machine such that the front facet of the first ferrule is held at a 45-degree angle to the surface of the polisher (56). The corner of the front surface of the first ferrule is polished until the optical fibers are completely beveled at 45-degrees (60). The front surface of the second ferrule (which becomes the back surface of the completed assembly), is also polished to produce a flat surface polish (58) suitable for standard optical connectors such as the MPO/MTP™, as shown in FIG. 19.

Preferably, standard lapping and polishing techniques are applied, including progressively finer grits of polishing paper, correct timing, appropriate slurry mixtures, and a method of holding the parts in a rigid manner.

It is at this point that a thin reflective metallic coating can be applied to the 45-degree beveled surface. The thin reflective metallic coating can be made of gold, silver, etc. The metal surface creates a mirror surface on the inside region of the optical fiber. The rest of this document will assume no metallic coating, but there is no difference to the procedure if one is included at this point.

Figure 22A:
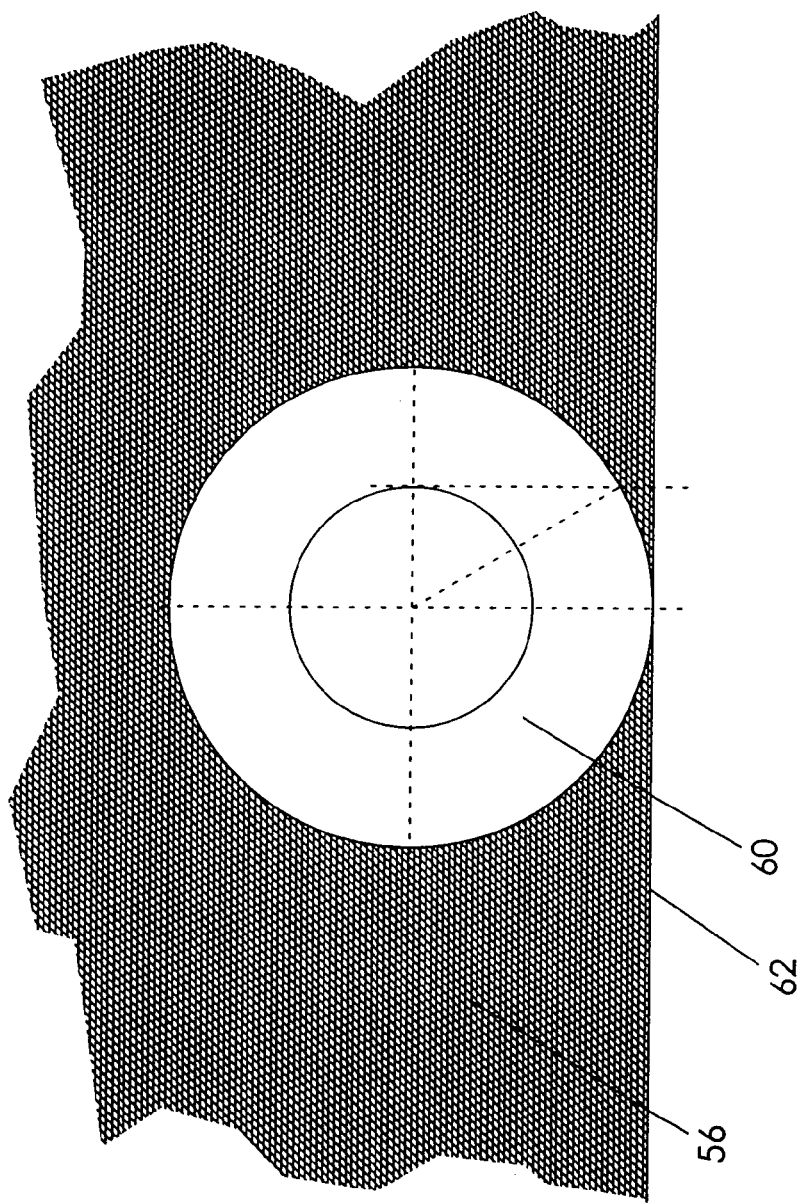
FIG. 22a is an end view of a single Multi-Mode (MM) optical fiber before over-polish.
Figure 22B:
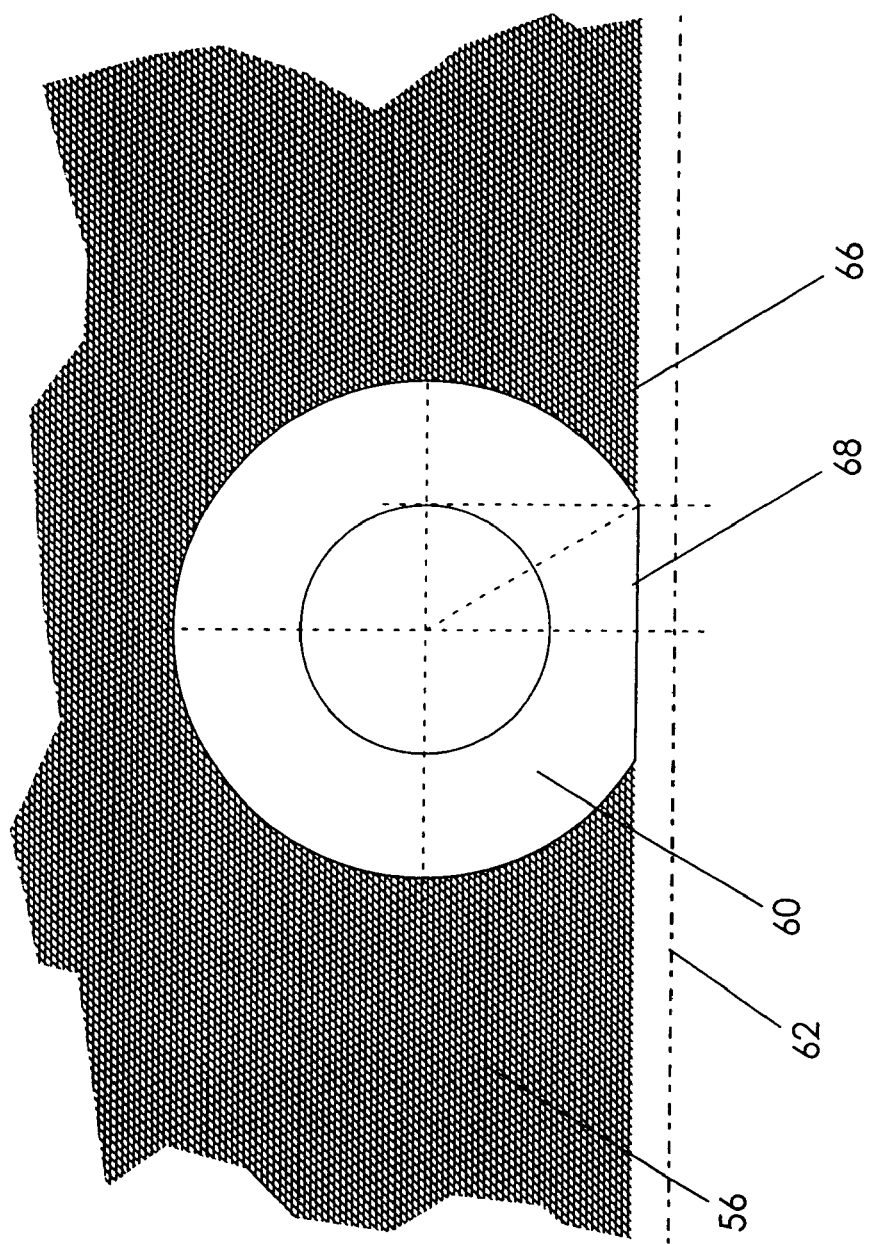
FIG. 22b is an end view of a singls MM optical fiber after an 8.5 micron over-polish.

The assembly is then placed on a polishing machine such that the larger bottom surface (62) is in contact with the polishing surface. The bottom surface is lapped and polished until the longitudinal sides of the optical fibers have been exposed, as shown in FIG. 22*a*. The over-polishing technique can now be used to improve coupling efficiency by getting closer to the core of the optical fibers. Furthermore, due to the typically opaque or poor optical quality of the plastic molded ferrule, the over-polishing technique is essentially required. By polishing into the plastic face by at least 8.5-microns (66), as shown in FIG. 22*b*, windows of the width of the multimode optical fiber core (68) can be produced allowing the light to pass into the lateral side of the optical fibers. Over-polishing can be extended further into the plastic ferrule thereby increasing the window opening to the optical fibers as long as the core is not damaged.

Figure 20:
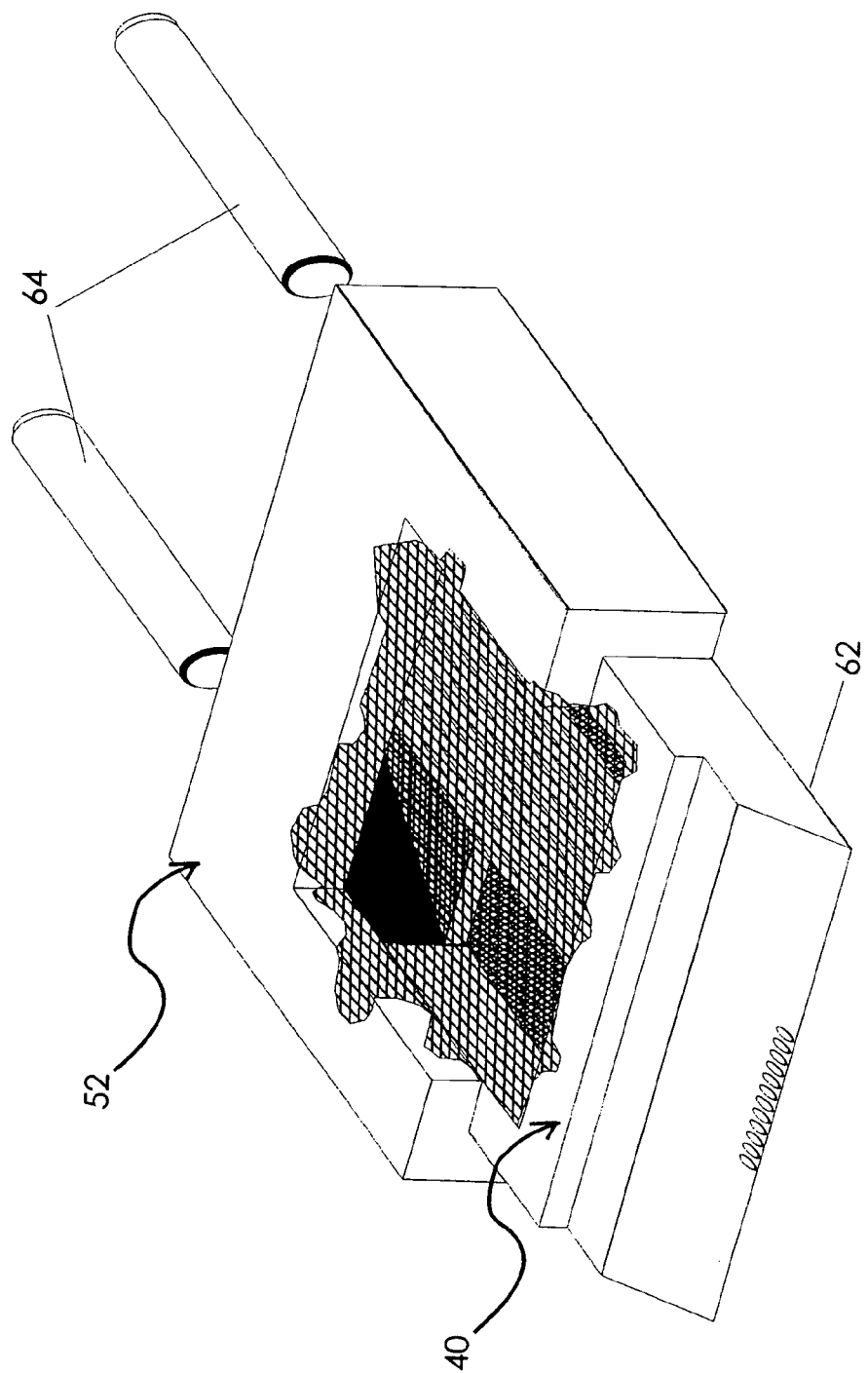
FIG. 20 is a 3D perspective view of the intermediate assembly where the bottom surface has been polished flat to expose the optical fibers and where the dowel pins are inserted into the back surface.

Finally, the dowel pins (64) are inserted into their respective holes as shown in FIG. 20. The complete plastic ferrule is shown in profile in FIG. 21.

Applications

The parallel optical ferule may be used in applications involving the direct coupling of light from a micro-laser, such as a VCSEL, into an optical fiber. Conversely, coupling light out of an optical fiber onto a photodetector, such as a PIN diode, can also be done. The parallel optical ferule may also be used to couple light into optical elements such as a micro-lens array.

Although the previous embodiments do not specify the use of multimode or single mode optical fiber, the physical structure of the previous embodiments imply the use of a relative large optical target such as a multimode optical fiber core of 62.5-microns. In this application where a lens structure is used, a smaller target, such as a single-mode optical fiber core of only 8-microns (effective field diameter), is possible. The lens structure focuses the light into a smaller spot closer to the diameter of the single-mode optical fiber core.

The applications comprise the applications listed in co-pending patent application bearing attorney docket number 16005-1US.

The embodiments of the invention described above are intended to be exemplary only. The scope of the invention is therefore intended to be limited solely by the scope of the appended claims.

We claim:

1. A method for manufacturing an optical connector achieving a mechanical coupling, comprising:
   embedding a length of at least one optical fiber in a body to form an assembly;
   at a first end of said assembly, removing a portion of the assembly to provide a beveled surface on a corresponding first end of said at least one optical fiber at which light is reflected for a side coupling;
   at a portion of a side of said assembly near said first end, creating an optical surface to provide a flat coupling surface for said side coupling;
   at a second end of said assembly, removing a portion of the assembly to provide a flat abutment surface including a corresponding second end of said at least one optical fiber;
   providing at said second end of said assembly a mating structure for precision connecting with a complementary connector in which an optical waveguide is end-coupled with at least one optical fiber.

2. The method as claimed in claim 1, wherein said at least one optical fiber comprises a plurality of optical fibers arranged parallel to one another with a predetermined spacing arrangement.

3. The method as claimed in claim 2, wherein said creating an optical surface results in a partial removal of a cladding of said optical fibers on said side of the assembly near said first end.

4. The method as claimed in claim 2, further comprising providing a package of optoelectronic elements disposed along a line, said package having a single planar window, positioning said window on said coupling surface to align said elements with said optical fibers, and bonding said window to said coupling surface such that said optoelectronic elements are coupled with said optical fibers in a one-to-one manner.

5. The method as claimed in claim 1, wherein said embedding comprises:
   providing at least one fiber V-groove in said body, each said V-groove adapted for receiving one said optical fiber;
   inserting an optical fiber in each of the at least one fiber V-groove;
   providing a coating substance over at least one part of said body, in the vicinity of the at least one fiber V-groove; and
   sealing the optical fiber in each of the at least one fiber V-groove provided in the body using the coating substance and a flattened material provided over said body to create a sealed assembly.

6. The method as claimed in claim 5, wherein said providing said mating structure comprises:
   providing at the second end of the assembly at least two alignment V-grooves parallel to said at least one fiber V-groove, at least one of the at least two alignment V-grooves being adapted to receive a dowel;
   wherein the combination of each alignment V-groove with a corresponding alignment V-groove provides said precision connecting.

7. The method as claimed in claim 6, wherein a core of said optical fiber is in a same plane as axes of said alignment V-grooves.

8. The method as claimed in claim 6, wherein:
   a cover member is bonded over said alignment V-grooves;
   said at least one optical fiber comprises a plurality of optical fibers arranged parallel to one another;
   said cover member comprises opposed alignment V-grooves positioned opposite said alignment V-grooves of said assembly;
   said bonding of said cover member comprises inserting dowel pins in said alignment V-grooves whereby said cover member is spaced from said assembly with said optical fibers being centered at said second end in a plane extending through an axis of said dowel pins, and positioning said cover member inset from said second end,
   whereby said cover member does not interfere with use of said second end for precision abutment coupling with said complementary ferrule.

9. The method as claimed in claim 8, wherein said alignment V-grooves and said opposed alignment V-grooves provide a four-point connection with said dowel.

10. The method as claimed in claim 8, wherein said creating an optical surface results in a partial removal of a cladding of said optical fibers on said side of said assembly near said first end.

11. The method as claimed in claim 8, further comprising the step of removing said flattened material on said sealed assembly before said bonding said cover member.

12. The method as claimed in claim 5, wherein said flattened material is transparent, further comprising the step of buffing at least said coupling surface of said assembly on said flattened material.

13. The method as claimed in claim 12, wherein the coating substance is light activated, further comprising the step of light activating the coating substance through said flattened material.

14. The method as claimed in claim 1, wherein said bevel surface is at approximately 45 degrees with respect to said optical fiber.

15. The method as claimed in claim 6, wherein the at least one fiber V-groove are etched in silicon.

16. The method as claimed in claim 1, wherein the assembly is made using a plastic-molding technique.

17. The method as claimed in claim 3, wherein the assembly is made using a plastic-molding technique, said optical fibers being positioned in said assembly closer to said side near said first end than at said second end, said creating an optical surface at a portion of a side of said assembly near the first end comprising polishing evenly all of said side so as to remove said cladding at said first end only.

18. The method as claimed in claim 1, wherein the bevel surface is coated with a reflective substance.

19. The method as claimed in claim 1, wherein said removing a portion of said assembly comprises polishing said portion.

20. The method as claimed in claim 1, wherein said creating an optical surface at a portion of a side of the assembly comprises polishing said portion.

21. An optical coupling assembly comprising:
   a plurality of optical fibers embedded in a parallel arrangement in a body having a beveled end, a substantially flat side coupling surface near said beveled end and an opposite connector end, light being coupled between said coupling surface, said beveled end and said optical fibers;
   a package of optoelectronic elements disposed along a line, said package having a single planar window bonded to said coupling surface such that said optoelectronic elements are coupled with said optical fibers in a one-to-one manner; and
   a precision end-couple ferrule member provided at said connector end of said body for guiding a complementary ferrule member to end-couple fiber-to-fiber said plurality of optical fibers at said connector end.

22. An optical coupling assembly comprising:
   a plurality of optical fibers embedded in a parallel arrangement in a body having a connector end;
   at least two alignment V-grooves in said body at said connector end;
   a cover member having corresponding opposite alignment V-grooves;
   at least two dowel pins bonded in said alignment V-grooves and connecting said cover member to said body, said dowel pins and said V-grooves being dimensioned such that said cover member is spaced from said body with said cover member inset from said connector end, wherein said dowel pins are adapted for guiding a complementary ferrule member to end-couple fiber-to-fiber said plurality of optical fibers at said connector end.

23. The assembly as claimed in claim 22, wherein said body has a beveled end opposite said connector end, light being coupled between a side coupling surface of said body, said beveled end and said optical fibers.

24. The assembly as claimed in claim 23, wherein a part of a cladding of said optical fibers is removed at least near said beveled end to improve light coupling.

25. The assembly as claimed in claim 22, wherein said optical fibers are centered at said connector end in a plane extending through an axis of said dowel pins.

* * * * *